(12) United States Patent
Tsuchitoi et al.

(10) Patent No.: US 9,836,254 B2
(45) Date of Patent: *Dec. 5, 2017

(54) IMAGE FORMING APPARATUS, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventors: Naoki Tsuchitoi, Kawasaki (JP); Akari Yasukawa, Yokohama (JP); Shota Shimizu, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/751,283

(22) Filed: Jun. 26, 2015

(65) Prior Publication Data
US 2015/0293726 A1 Oct. 15, 2015

Related U.S. Application Data

(63) Continuation of application No. 14/163,033, filed on Jan. 24, 2014, now Pat. No. 9,098,221.

(30) Foreign Application Priority Data

Jan. 31, 2013 (JP) .................................. 2013-016864

(51) Int. Cl.
*G06F 3/12* (2006.01)
*H04L 29/06* (2006.01)
(Continued)

(52) U.S. Cl.
CPC .......... *G06F 3/1222* (2013.01); *G06F 3/1238* (2013.01); *G06F 3/1285* (2013.01);
(Continued)

(58) Field of Classification Search
USPC ........................................................ 358/1.14
See application file for complete search history.

(56) References Cited

U.S. PATENT DOCUMENTS 7,430,760 B2 9/2008 Townsend et al.
2008/0263329 A1* 10/2008 Archer et al. ................ 712/213
(Continued)

FOREIGN PATENT DOCUMENTS

JP 2008219419 A 9/2008
JP 4676744 B2 4/2011

OTHER PUBLICATIONS

Office Action issued in U.S. Appl. No. 14/163,033, mailed Sep. 19, 2014.
(Continued)

*Primary Examiner* — Ngon Nguyen
(74) *Attorney, Agent, or Firm* — Rossi, Kimms & McDowell LLP

(57) ABSTRACT

An image forming apparatus that facilitates management of information security policy even for an extended application installed from exterior. A scanning unit scans an original to generate image data of the original. A printing unit prints an image based on image data. A management unit manages applications dynamically installed. At least one of the applications executes a job using at least one of the scanning unit and the printing unit. A setting unit sets an operation mode for the image forming apparatus, based on security settings that are received from an external apparatus. A determination unit determines whether each of the applications supports the security settings. A control unit restricts an operation of an application that the determination unit determines that the application does not support the security settings.

37 Claims, 26 Drawing Sheets

(51) Int. Cl.
*H04N 1/44* (2006.01)
*H04N 1/00* (2006.01)

(52) U.S. Cl.
CPC ............ *H04L 63/10* (2013.01); *H04L 63/105* (2013.01); *H04L 63/20* (2013.01); *H04N 1/0088* (2013.01); *H04N 1/00854* (2013.01); *H04N 1/00859* (2013.01); *H04N 1/44* (2013.01); *H04N 1/4433* (2013.01); *H04N 2201/0094* (2013.01)

(56) References Cited

U.S. PATENT DOCUMENTS

2009/0006989 A1* 1/2009 Park .............................. 715/762
2009/0080013 A1* 3/2009 Sato et al. ................... 358/1.15

OTHER PUBLICATIONS

Notice of Allowance issued in U.S. Appl. No. 14/163,033, mailed Mar. 31, 2015.

\* cited by examiner

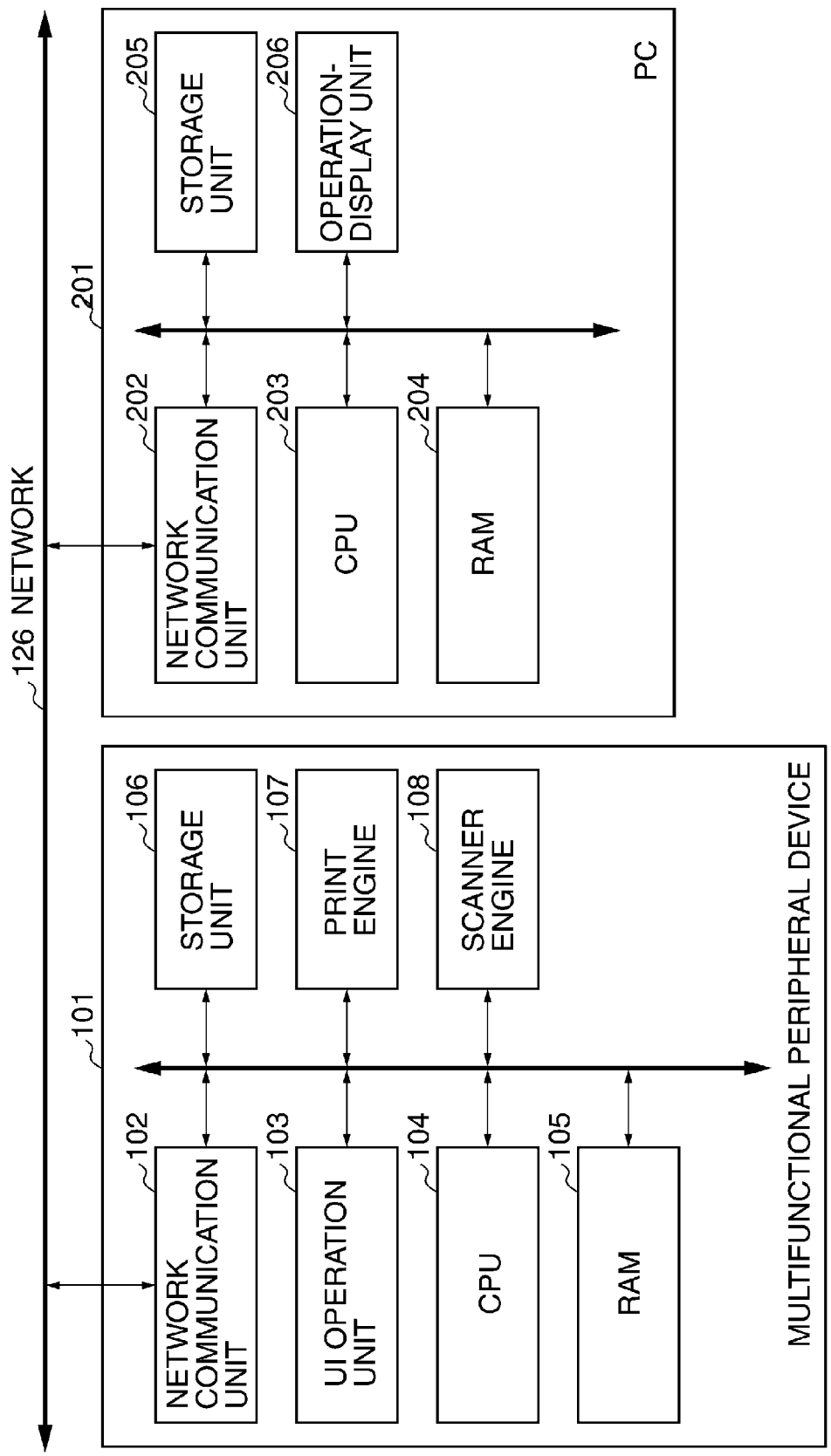

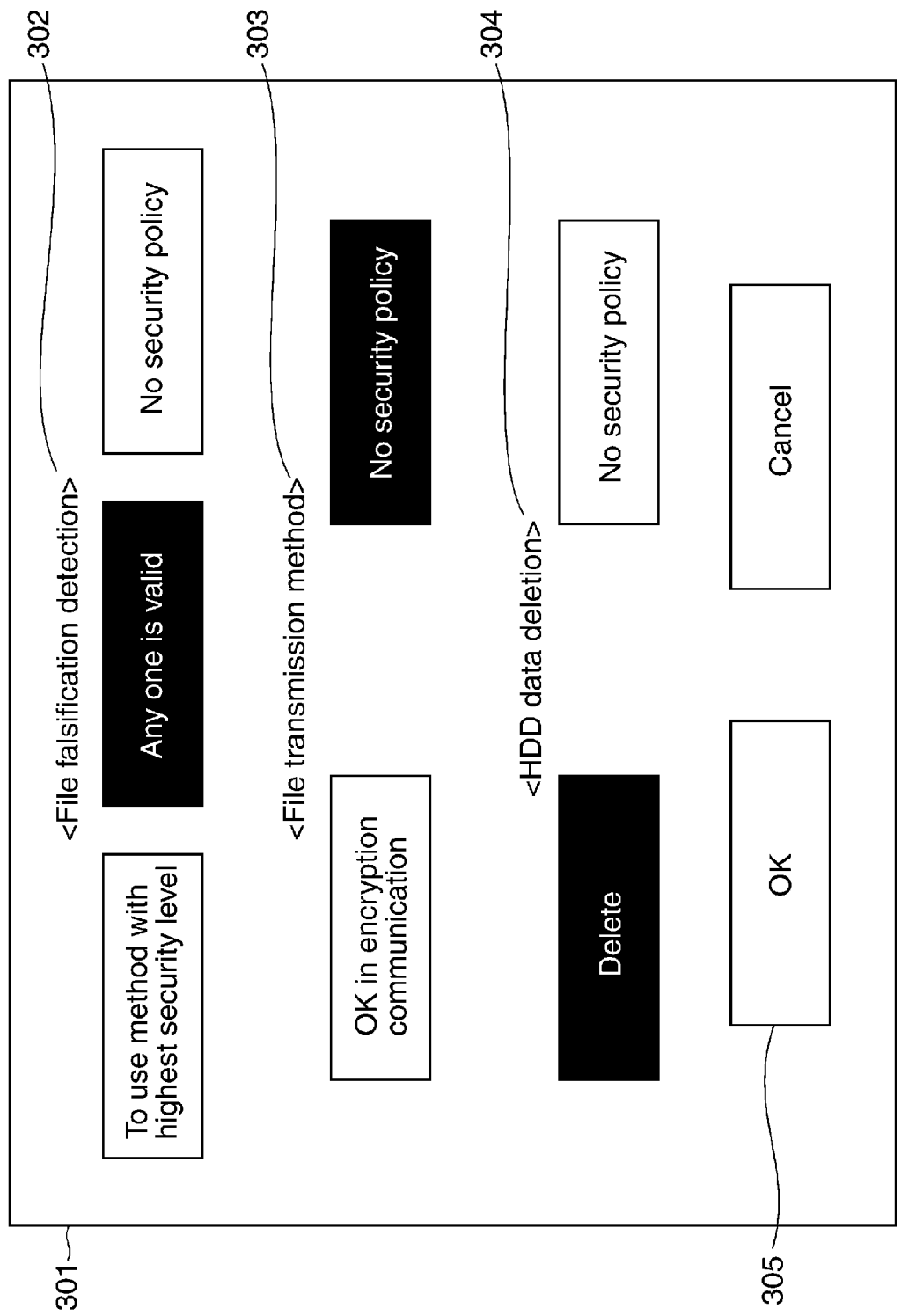

FIG.4A

| Name of information security policy | Value of information security policy |
|---|---|
| File falsification detection | Any one is valid |
| File transmission method | No security policy |
| HDD data deletion | Delete |

FIG.4B

501 — Rule section (502):

| Name of information security policy | Name of corresponding user mode |
|---|---|
| File falsification detection | PDF with compulsory digital signature |
| | PDF with compulsory hash |
| File transmission method | FTP |
| | SFTP |

501 — Condition section (503):

| Name of information security policy | Possible value of security policy | Condition for determining whether user mode comply with security policy |
|---|---|---|
| File falsification detection | To use method with highest security level | PDF with compulsory digital signature: ON |
| | Any one is valid | PDF with compulsory digital signature: ON or PDF with compulsory hash: ON |
| | No security policy | No |
| File transmission method | OK in encryption communication | FTP: OFF and SFTP: ON |
| | No security policy | No |

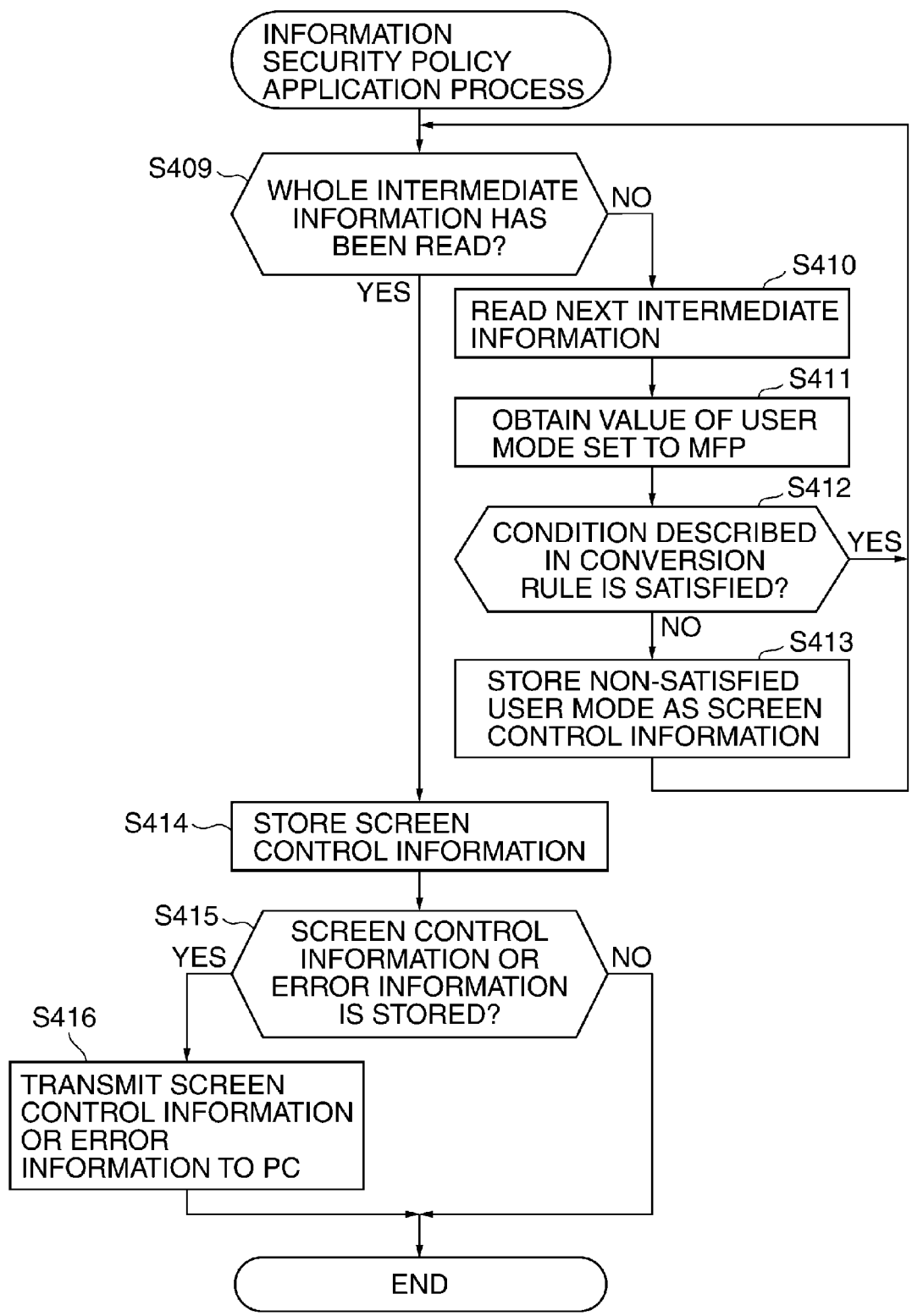

| PDF with compulsory digital signature | OFF |
|---|---|
| PDF with compulsory hash | OFF |
| FTP | ON |
| SFTP | ON |

| PDF with compulsory digital signature | Any one is valid | PDF with compulsory digital signature: ON or PDF with compulsory hash: ON |
|---|---|---|
| PDF with compulsory hash | | |

FIG.8A

<Error!>
The following security policy cannot be set.
・HDD data deletion

<Caution!>
It is against security policy.
Review the following settings.
・PDF with compulsory digital signature
・PDF with compulsory hash

FIG.8B

<Caution!>
Since it is against security policy,
device is not available.

Review the following settings.
・PDF with compulsory digital signature
・PDF with compulsory hash

| 1204 | 1205 | 1206 | 1207 |
|---|---|---|---|
| Application name | Version | Application identifier | Policy version |
| Scanning transmitting application | V1.00 | 0x1234 | V1.00 |
| IC card certifying application | V1.05 | 0x1256 | V2.00 |
| Personal secure print | V1.00 | 0x1278 | - |

| Policy | Setting value | |
|---|---|---|
| File falsification detection | No | ~1401 |
| File transmission method =OK in encryption communication | FTP communication = OFF<br>SSL communication = ON | ~1402 |

FIG.15B

| Setting value | Reboot | |
|---|---|---|
| FTP communication | Needed | ~1411 |
| SSL communicatio | Not needed | ~1412 |

FIG.17

```
<?xml version="1.0" encoding="UTF-8"?>
-<security policy>
   <file falsification detection value="Any one is valid"/>
   <file transmission method value="No security policy"/>
   <HDD data deletion value="Delete"/>
</security policy>
```

FIG.18

```xml
<?xml version="1.0"?>
-<policy conversion rule>
 -<file falsification detection>
  -<corresponding user mode>
   <PDF with compulsory digital signature/>
   <PDF with compulsory hash/>
  </corresponding user mode>
  -<rule>
   -<to use method with highest security level>
    <condition>PDF with compulsory digital signature==ON</condition>
   </to use method with highest security level>
   -<any one is valid>
    <condition>(PDF with compulsory digital signature==ON)||(PDF with
      compulsory hash==ON)</condition>
   </any one is valid>
   -<no security policy>
    <condition/>
   </no security policy>
  </rule>
 </file falsification detection>
 -<file transmission method>
  -<corresponding user mode>
   <FTP/>
   <SFTP/>
  </corresponding user mode>
  -<rule>
   -<OK in encryption communication>
    <condition>(FTP==OFF)&&(SFTP==ON)</condition>
   </OK in encryption communication>
   -<no security policy>
    <condition/>
   </no security policy>
  </rule>
 </file transmission method>
</policy conversion rule>
```

FIG.21

<Caution!>
Since the following extended application does nothave a function for applying a security policy, a setting value cannot be changed suitably.
Review the setting manually.

・Scanning transmitting application V1.00

FIG.22A

Policy version = V1.00

| Name of information security policy | File falsification detection | File transmission method | HDD data deletion |
|---|---|---|---|

FIG.22B

Policy version = V1.01

| Name of information security policy | File falsification detection | File transmission method | HDD data deletion | Password needs eight or more characters |
|---|---|---|---|---|

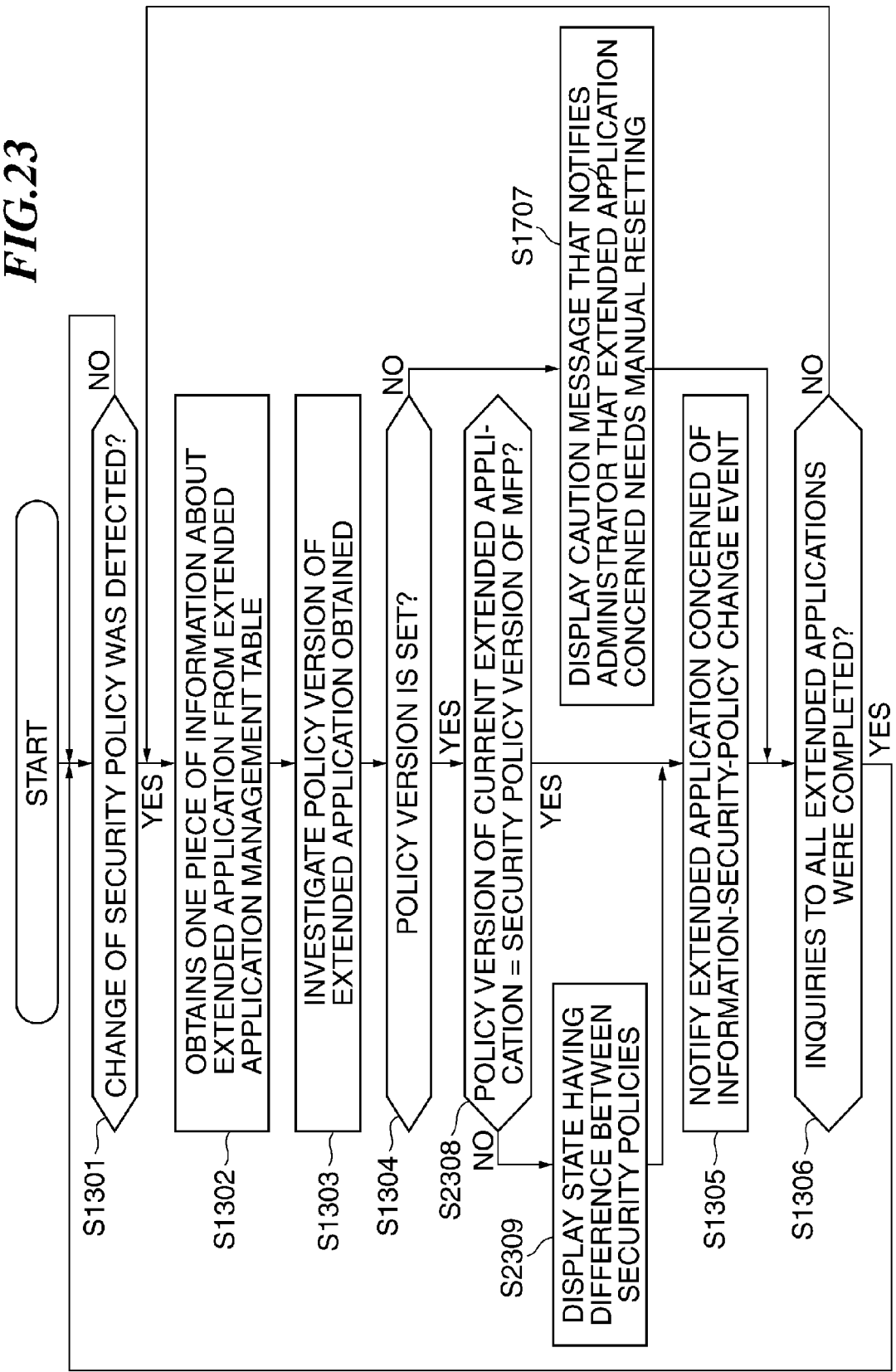

FIG.24

<Caution!>
Since the following extended application is different in a security policy version, some settings of security policy may not be reflected. Review the setting manually.

・Scanning transmitting application V1.00 —2401

・Security policy item —2402
"Password needs eight or more characters"

IMAGE FORMING APPARATUS, CONTROL METHOD THEREFOR, AND STORAGE MEDIUM STORING CONTROL PROGRAM THEREFOR

BACKGROUND OF THE INVENTION

Field of the Invention

The present invention relates to an image forming apparatus, a control method therefor, and a storage medium storing a control program therefor. Particularly, the present invention relates to an information-security-policy technique among apparatuses in a network environment.

Description of the Related Art

A personal computer (PC) and a server machine (a file server, an authentication server, etc.) that are connected to a network in an office are desirable to be operated according to an information security policy established for every office. The information security policy is a basic policy about information security of the whole company, and is decided by summarizing courses for controlling information use and for preventing an intrusion and an information leak.

There are peripherals, such as a multifunctional peripheral device and a printer, as apparatus connected to an office network in addition to a PC and a server machine. A multifunctional peripheral device in recent years does not only print and send an image simply, but also stores image data and gives a file service function to a PC, and it plays the same role as another server machine on a network.

In order to maintain safe and secure office environment, a multifunctional peripheral device also needs to comply with the information security policy like a PC and a server machine. The compliance with the information security policy here means to put a security restriction on operations in order to prevent an unauthorized use of the multifunctional peripheral device in an office and information leak therefrom. For example, the multifunctional peripheral device obligatorily requires user authentication before an operation or encryption of a communication path.

In order to comply with the information security policy, a PC or a server machine employs a method of distributing setting values that depend on an OS. For example, the setting values depending on the OS about encryption of a communication path, such as "non-SSL connection is permitted", are managed so that a PC of any vender uniformly complies with the information security policy.

On the other hand, since items settable to multifunctional peripheral devices differ from vender to vender, an administrator must set the multifunctional peripheral devices so as to comply with the information security policy one by one based on the understanding of many operation settings (referred to as "user modes", hereafter) for the respective multifunctional peripheral devices. For example, the setting value of the user mode about the encryption of a communication path is "to use SSL" in a multifunctional peripheral device of an A-company, but is "to encrypt HTTP communication" in a multifunctional peripheral device of a B-company. Accordingly, since the administrator cannot make multifunctional peripheral devices uniformly comply with the information security policy by distributing setting values, unlike a PC and a server machine, the administrator expends much effort. Moreover, an incorrect setting actually allows operations that do not comply with the information security policy, which may threaten office security.

Development environments and API (application programming interface) for some models of recent multifunctional peripheral devices are exhibited. This enables what is called third-party vendors other than the vendors that design and produce the multifunctional peripheral devices to add a function that operates inside a multifunctional peripheral device as an extended application. For example, even when the mechanisms of user authentication differ from client to client, a third-party vendor can generate and supply an extended application corresponding to a client's request, which enables to respond to a detailed need of every client. Some of such extended applications have setting values about security, and therefore, operations in compliance with the information security policy are desired.

Accordingly, a system that generates and distributes user modes of multifunctional peripheral devices when an administrator inputs according to an information security policy is proposed (for example, see Japanese Laid-Open Patent Publication (Kokai) No. 2008-219419 (JP 2008-219419A)). In this system, the administrator answers to questions displayed on a setting screen of a PC according to the information security policy. When receiving the answer, the PC generates a setting value (referred to as "security policy data", hereafter) that does not depend on a multifunctional peripheral device based on the answer, and converts the generated security policy data into a user mode depending on the multifunctional peripheral device of a distribution destination. Then, the administrator can achieve the state in compliance with the information security policy by distributing the user mode to the respective multifunctional peripheral devices from the PC without having knowledge about the multifunctional peripheral devices, even if the user modes of the multifunctional peripheral devices differ.

Moreover, a mechanism that an information-security-policy change is notified by an OS of a personal computer to reflect a policy to an extended application is proposed (for example, see Japanese Patent No. 4676744). According to this mechanism, a module that manages the information security policy distributes the information security policy to each security engine (for example, a firewall and virus detection software) when receiving the information security policy. A security engine collects information from other security engines using an API (Application Program Interface) in the state where the information security policy has been distributed. Each security engine decides an operation based on setting states of other security engines.

In contrast to the above-mentioned prior art, a system that can change a user mode while maintaining a state in compliance with an information security policy may be desirable. For example, the multifunctional peripheral device shall support options "to use SSL" and "to use IPSEC" in the information security policy that obligatorily requires encryption of a communication path, and the state in compliance with the information security policy shall be achieved when enabling one of the options.

In a conventional system, when the setting value that enables the option "to use SSL" is distributed, a user cannot enable the option "to uses IPSEC" personally even if wanted. When the user wants to enable the option "to uses IPSEC", the user must request re-distribution of the user mode in compliance with the information security policy from an administrator, which loses convenience.

Moreover, the conventional system does not provide a mechanism that gives the system explicit instructions (for example, session disconnection, logout of the user concerned, system reboot, etc.) after distributing information security policies to extended applications. Accordingly, the conventional system always requires system reboot after distribution. For example, although the system reboot of a general PC only affects on a user who uses the PC concerned, the system reboot of a multifunctional peripheral device causes device unavailable time (what is called downtime) that affects on a plurality of users, because the multifunctional peripheral device is shared by the users and processes a plurality of jobs simultaneously. Also in order to minimize such downtime, there is a demand to avoid the system reboot as possible.

SUMMARY OF THE INVENTION

The present invention provides a control technique that facilitates management of an information security policy even for an extended application installed into an image processing apparatus from the exterior.

Accordingly, a first aspect of the present invention provides an image forming apparatus comprising a scanning unit configured to scan an original to generate image data of the original, a printing unit configured to print an image based on image data, a management unit configured to manage applications dynamically installed, at least one of the applications executing a job using at least one of the scanning unit and the printing unit, a setting unit configured to set an operation mode for the image forming apparatus, based on security settings that are received from an external apparatus, a determination unit configured to determine whether each of the applications supports the security settings, and a control unit configured to restrict an operation of an application that the determination unit determines that the application does not support the security settings.

Accordingly, a second aspect of the present invention provides a control method for an image forming apparatus, comprising a scanning step of scanning an original to generate image data of the original, a printing step of printing an image based on image data, a management step of managing applications dynamically installed, at least one of the applications executing a job in at least one of the scanning step and the printing step, a setting step of setting an operation mode for the image forming apparatus, based on security settings that are received from an external apparatus, a determination step of determining whether each of the applications supports the security settings, and a control step of restricting an operation of an application that the application is determined not to support the security settings in the determination step.

Accordingly, a third aspect of the present invention provides a non-transitory computer-readable storage medium storing a control program causing a computer to execute the control method of the second aspect.

According to the present invention, the apparatus can keep the operation under the state in compliance with the information security policy as a whole, even when the extended application has been already installed.

Further features of the present invention will become apparent from the following description of exemplary embodiments with reference to the attached drawings.

BRIEF DESCRIPTION OF THE DRAWINGS

FIG. 1 is a block diagram schematically showing hardware configurations of devices that configure an information processing system according to a first embodiment of the present invention.

FIG. 3 is a view showing an example of a policy setting screen displayed on an operation-display unit of the PC shown in FIG. 1.

FIG. 4A is a view showing an example of security policy data stored in the PC shown in FIG. 1, FIG. 4B is a view showing an example of a conversion rule file stored in the multifunctional peripheral device shown in FIG. 1.

FIG. 6 is a flowchart showing an information security policy application process executed by the multifunctional peripheral device shown in FIG. 1.

FIG. 8A and FIG. 8B are views showing examples of display screens by which the PC shown in FIG. 1 attracts an administrator's attention.

FIG. 13 is a view showing an example of an extended application management table managed by the extended application management module shown in FIG. 2A.

FIG. 15A is a view showing an example of relation between an information security policy and a setting value, and FIG. 15B is a view showing an example of table information for determining whether the change of the setting value for the extended application requires system reboot.

FIG. 17 is a view showing an example of the security policy data written in an XML format.

FIG. 18 is a view showing an example of the contents of the conversion rule file written in the XML format.

FIG. 21 is a view showing an example of a caution message displayed on a UI operation unit according to the process shown in FIG. 20.

FIG. 22A is a view showing a list of information security policy items under the policy version V1.00, and FIG. 22B is a view showing a list of information security policy items under the policy version V1.01.

FIG. 23 is a flowchart showing an operation of a policy change notification module according to a third embodiment of the present invention.

FIG. 24 is a view showing an example of a caution message displayed on the UI operation unit according to the process shown in FIG. 23.

DESCRIPTION OF THE EMBODIMENTS

Figure 2A:
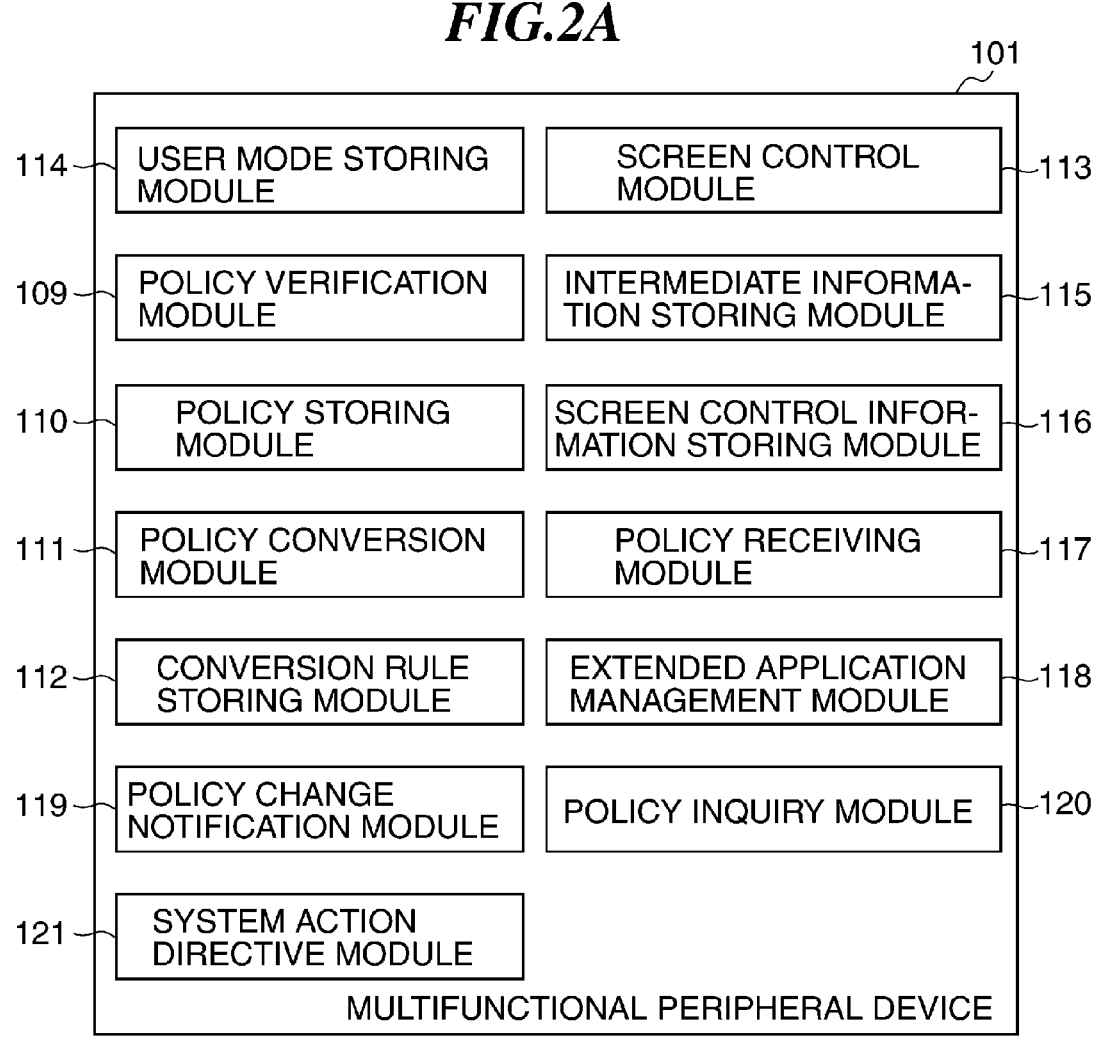
FIG. 2A is a block diagram schematically showing a configuration of functions relevant to control of an information security policy in a multifunctional peripheral device shown in FIG. 1.

Hereafter, embodiments according to the present invention will be described in detail with reference to the drawings.

A first embodiment of the present invention will be described. FIG. 1 is a block diagram schematically showing hardware configurations of devices that configure an information processing system according to the first embodiment of the present invention.

As shown in FIG. 1, the information processing system according to the first embodiment of the present invention is provided with a multifunctional peripheral device 101 as an example of an image processing apparatus, a personal computer (PC) 201 as an example of an information processing apparatus, and a network 126 through which they are mutually connected. It should be noted that the information processing system of the present invention is not limited to the illustrated example, and that a plurality of apparatuses may be connected to the network 126 in addition to the illustrated apparatuses. Moreover, an image processing apparatus (for example, a printer, a scanner, a personal digital assistant, etc.) other than the multifunctional peripheral device may be employed.

The multifunctional peripheral device 101 is provided with a network communication unit 102, a UI operation unit 103, a CPU 104, a RAM 105, a storage unit 106, a print engine 107, and a scanner engine 108. The network communication unit 102 communicates with an external device (for example, the PC 201) via the network 126. The UI operation unit 103 receives setting to the multifunctional peripheral device 101, displays the state of the multifunctional peripheral device 101, and allows an operation from a user. The CPU 104 processes print data and executes various controls. The RAM 105 temporarily stores a program code executed by the CPU 104 and information like image data. The storage unit 106 stores the program code, image data, etc. The print engine 107 prints image data on a sheet medium using known technique, such as an electrophotographic technique or an ink jet technique. The scanner engine 108 optically reads an image printed on a sheet medium.

In the above-mentioned configuration, a copy function in the multifunctional peripheral device 101 is achieved as follows. That is, when a user operates the UI operation unit 103 to instruct a copy operation, the CPU 104 makes the scanner engine 108 read image data according to the program code stored in the RAM 105. The read image data is taken into the storage unit 106, and is outputted with the print engine 107 after applying a necessary image process.

Moreover, a PDF transmitting function is achieved as follows. That is, when a user operates the UI operation unit 103 to instruct a PDF transmission, the CPU 104 makes the scanner engine 108 read image data according to the program code stored in the RAM 105. The read image data is taken into the storage unit 106, is converted into the PDF format, and is transmitted from the network communication unit 102 to a specified destination.

The PC 201 is provided with a network communication unit 202, a CPU 203, a RAM 204, a storage unit 205, and an operation-display unit 206. The network communication unit 202 communicates with an external device via the network 126. The CPU 203 executes various controls. The RAM 204 temporarily stores information like a program code executed by the CPU 203. The storage unit 205 stores the program code, data, etc. The operation-display unit 206 receives an input to the PC 201 by an administrator. The operation-display unit 206 functions as an operation unit and a display unit.

Figure 2B:
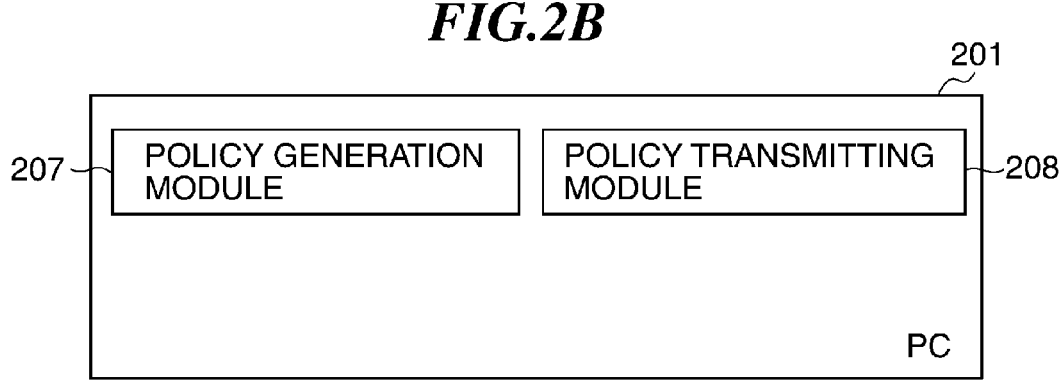
FIG. 2B is a block diagram schematically showing a configuration of functions relevant to control of the information security policy in a PC shown in FIG. 1.

FIG. 2A is a block diagram schematically showing a configuration of functions relevant to control of an information security policy in the multifunctional peripheral device 101 shown in FIG. 1, and FIG. 2B is a block diagram schematically showing a configuration of functions relevant to control of the information security policy in the PC 201 shown in FIG. 1. Although this embodiment is described as the illustrated functions are configured by the software modules, they may be configured by hardware components.

In FIG. 2A, a user mode storing module 114 stores names and values of setting items (referred to as "user modes", hereafter) in connection with operations of the multifunctional peripheral device 101 that were set through the UI operation unit 103 into the storage unit 106.

The user mode setting items includes "PDF with compulsory digital signature" and "PDF with compulsory hash", for example.

The "PDF with compulsory digital signature" is a setting item of a function for verifying that a file creator is a signer by adding an electronic signature to a file. The electronic signature is obtained by enciphering a hash value with a file creator's secret key. The hash value is compulsorily computed by the multifunctional peripheral device 101 based on a PDF file when generating the PDF file. When the user mode setting item "PDF with compulsory digital signature" is valid, falsification of a generated file can be detected.

The "PDF with compulsory hash" is a setting item of a function for enabling file falsification detection by adding a hash value to a file. The hash value is compulsorily computed based on a PDF file when generating the PDF file.

Moreover, "FTP", "SFTP", etc. are examples of the user mode setting items. The FTP is the abbreviated name for File Transfer Protocol, and is a communication protocol for file transfer in a network. The SFTP is the abbreviated name for SSH File Transfer Protocol, and is a communication protocol for file transfer in a network using encryption communication. When the user mode setting item "FTP" or "SFTP" is valid, the function for transmitting a file stored in the storage unit 106 using the FTP or the SFTP is available.

A policy storing module 110 stores security policy data (security settings) sent from the outside via the network communication unit 102 into the storage unit 106 etc. A conversion rule storing module 112 stores a conversion rule file into the storage unit 106 etc. In the conversion rule file, information required in order to compare the security policy data with the values of the current user modes of the multifunctional peripheral device 101 is written. Details of the conversion rule file will be mentioned later.

A policy conversion module 111 generates intermediate information used for comparing the security policy data with the values of the user modes based on the conversion rule file stored in the conversion rule storing module 112. An intermediate information storing module 115 is constituted by a nonvolatile storage unit, and stores the intermediate information generated by the policy conversion module 112.

A policy verification module 109 compares the intermediate information stored in the intermediate information storing module 115 with the values of the user modes stored in the user mode storing module 114, and determines according to the conditions written in the conversion rule file. When the determination result does not satisfy the conditions, the policy verification module 109 generates screen control information.

A screen control information storing module 116 stores the screen control information generated by the policy verification module 109 into the storage unit 106 etc.

In addition to the above functions, the policy verification module 109 controls operations of various applications of the multifunctional peripheral device 101. The multifunctional peripheral device 101 has the various applications (not shown) for providing a transmission function, a printing function, a file server function, etc. The policy verification module 109 controls the various applications so as to operate restrictively according to the information security policy, or prohibits starting of an application that does not comply with the information security policy.

The multifunctional peripheral device 101 has a send module (not shown) that controls the scanner engine 108 to read an original optically, files the obtained image data into an electronic file, and sends the file to a specified destination.

Moreover, the multifunctional peripheral device 101 has a module that interprets and prints a PDL code received via the network from the PC 201 or another device. Moreover, the multifunctional peripheral device 101 has a BOX module that accumulates image data in the storage unit 106. Furthermore, the multifunctional peripheral device 101 has a Web browser module that reads and displays information on various websites on the Internet or an intranet using the HTTP or HTTPS. The policy verification module 109 determines whether these applications comply with the information security policy. When it is determined that an application does not comply with the information security policy, screen control information will be generated or starting of the application concerned will be restricted.

An application that is dynamically added to the multifunctional peripheral device 101 and is deleted therefrom is also controlled by the policy verification module 109. For example, MEAP (registered trademark, Multi-functional Embedded Application Platform) is a commercial product that can dynamically add and delete a built-in application by installing execution environment of Java (registered trademark) into the multifunctional peripheral device 101.

Moreover, when the vender of the MEAP discloses an API (application platform interface) of the MEAP to other venders, a third-party vender can create an application. Hereafter, such an application is called an extended application.

An extended application management module 118 manages and operates a plurality of extended applications of the multifunctional peripheral device 101.

When detecting a change of the information security policy, a policy change notification module 119 notifies the extended applications managed by the extended application management module 118 of the change.

A policy inquiry module 120 receives an inquiry of the setting value of the information security policy from an extended application.

A system action directive module 121 receives an instruction for rebooting the multifunctional peripheral device 101 from an extended application.

A policy receiving module 117 stores the security policy data that the network communication unit 102 received into the policy storing module 110. A screen control module 113 controls a screen using the screen control information stored in the screen control information storing module 116.

In FIG. 2B, a policy generation module 207 generates the security policy data according to an administrator's input. A policy transmitting module 208 transmits the security policy data generated by the policy generation module 207 via the network 126 from the network communication unit 202.

Next, three stages of an information-security-policy control method according to the present invention will be described.

In the first stage, an administrator generates information security policy data that sets the multifunctional peripheral device 101 so as to comply with the information security policy using the PC 201.

In the second stage, the generated security policy data is transmitted to the multifunctional peripheral device 101 from the PC 201, and is applied to the multifunctional peripheral device 101. It is determined whether the multifunctional peripheral device 101 is set in the state in compliance with the information security policy, and the administrator is notified of the determination result.

In the third stage, the multifunctional peripheral device 101 to which the security policy data is applied is used by a user in the state in compliance with the information security policy.

First, a process of the first stage in which the administrator generates information security policy data that sets the multifunctional peripheral device 101 so as to comply with the information security policy using the PC 201 will be described.

FIG. 3 is a view showing an example of a policy setting screen displayed on the operation-display unit 206 of the PC 201 for generating security policy data. It should be noted that this embodiment describes only cases of setting three information security policies (file falsification detection, file transmission method, and HDD data deletion) in order to simplify a description, but more information security policies may be set actually. Moreover, although only a case where a value of each information security policy is selected using a radio button is described, a value may be specified according to a text inputted in a text field or may be selected from among a plurality of choices using check boxes.

As shown in FIG. 3, the policy setting screen 301 is a setting screen for setting three information security policies that are "file falsification detection" 302, "file transmission method" 303, and "HDD data deletion" 304.

The "file falsification detection" 302 is an information security policy that shows whether the falsification detection is required for a generated file. In this embodiment, the information security policy can be selected from among three choices that are "to use method with highest security level", "any one is valid", and "no information security policy". The illustrated example shows the state where the "any one is valid" is selected.

The "file transmission method" 303 is an information security policy that shows whether it is necessary to use encryption communication when transmitting and receiving a file. In this embodiment, the information security policy can be selected from among two choices that are "OK in encryption communication" and "no security policy". The illustrated example shows the state where the "no security policy" is selected.

The "HDD data deletion" 304 is an information security policy that shows whether the data remaining after processing should be deleted, when a nonvolatile storage unit (not shown) is used as a temporary data storage area in a copying process etc. in the multifunctional peripheral device 101. In this embodiment, the information security policy can be selected from among two choices that are "deletion" and "no security policy". The illustrated example shows the state where the "deletion" is selected.

The administrator sets the information security policies using the policy setting screen 301. When the operation-display unit 206 receives a depression of an "OK" button 305 in the policy setting screen 301, the policy generation module 207 generates the security policy data according to the contents set on the policy setting screen 301, and stores it to the storage unit 205. An example showing the security policy data stored in the storage unit 205 in a table format is shown in FIG. 4A. It should be noted that this embodiment shows the security policy data in the table format in order to simplify the description, but it may be shown in data format of an XML etc. FIG. 17 shows the security policy data shown in FIG. 4A in the XML format.

In the security policy data 401, the first row represents names (rules) 402 of the information security policies set by the administrator on the policy setting screen 301. The second row represents values (conditions) 403 of the respective information security policies selected by the administrator on the policy setting screen 301.

Next, a process of the second stage will be described. In the second stage, the generated security policy data is transmitted to the multifunctional peripheral device 101 from the PC 201, and is applied to the multifunctional peripheral device 101. Then, it is determined whether the multifunctional peripheral device 101 is set in the state in compliance with the information security policy, and the administrator is notified of the determination result.

When receiving an instruction to transmit the security policy data from the administrator, the operation-display unit 206 instructs the policy transmitting module 208 to transmit the data. When receiving the instruction, the policy transmitting module 208 transmits the security policy data stored in the storage unit 205 from the network communication unit 202 to the network communication unit 102 of the multifunctional peripheral device 101 via the network 126. It should be noted that the security policy data may be automatically distributed from the PC 201. Moreover, although the method of certifying that the data is transmitted from the administrator or the specific computer is desirable, this embodiment does not describe such a method.

Figure 5:
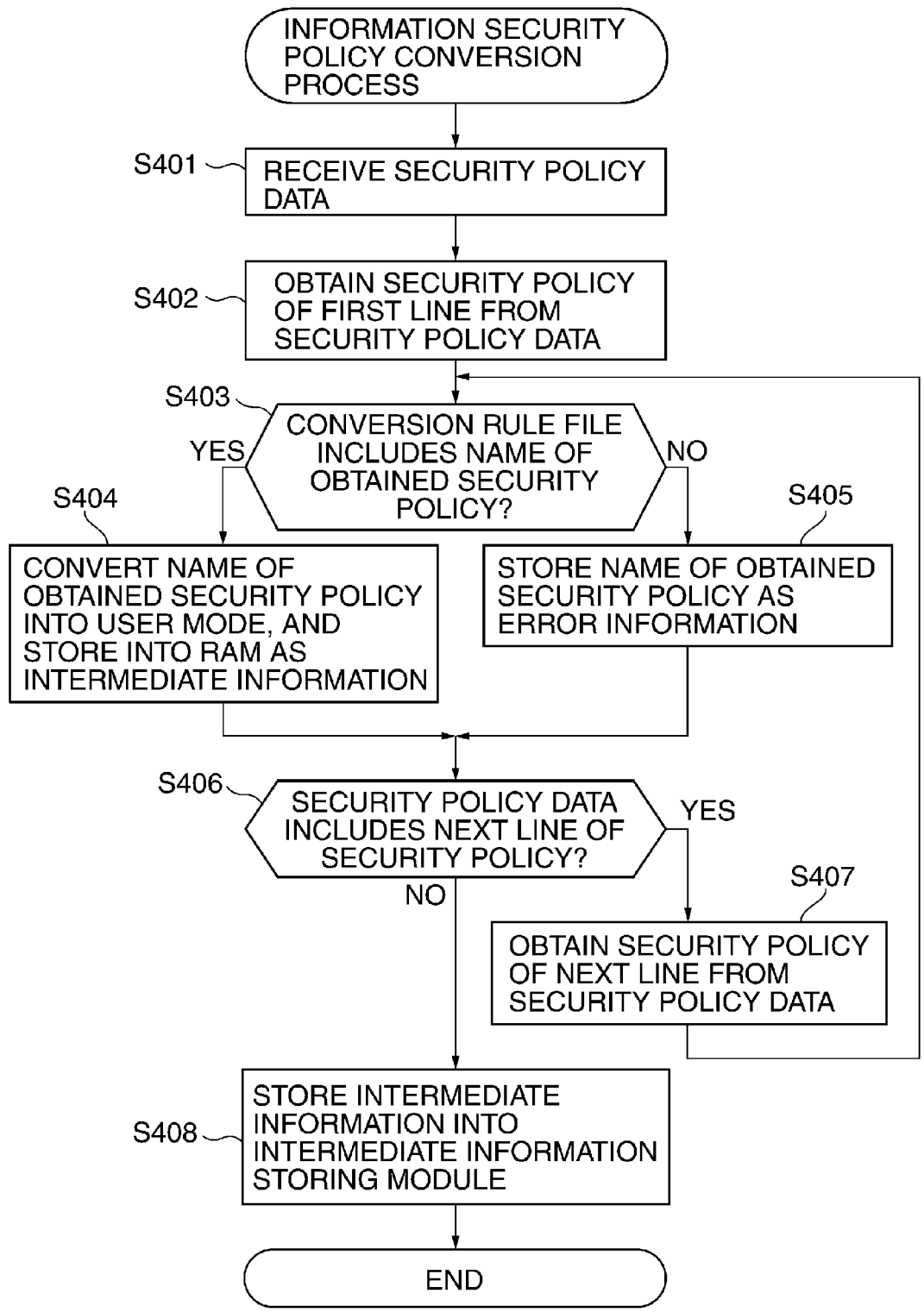
FIG. 5 is a flowchart showing an information security policy conversion process executed by the multifunctional peripheral device shown in FIG. 1.

FIG. 5 is a flowchart showing an information security policy conversion process executed when applying the security policy data to the multifunctional peripheral device 101. It should be noted that this process shall be executed by the CPU 104 according to a program read from the storage unit 106 to the RAM 105 unless otherwise specified.

As shown in FIG. 5, when the network communication unit 102 receives security policy data from the PC 201, the policy receiving module 117 stores the security policy data into the policy storing module 110 in step S401.

In the next step S402, the policy conversion module 111 obtains the information security policy of the first line from the security policy data stored in the policy storing module 110. Then, the name and value of the information security policy are extracted and stored in the RAM 105.

In the next step S403, the policy conversion module 111 obtains a conversion rule file 501 (FIG. 4B) stored in the conversion rule storing module 112. Then, the names of the information security policies written in a rule section 502 of the obtained conversion rule file is compared with the name of the information security policy stored in the RAM 105. Then, it is determined whether there is any matched name based on the comparative result. That is, it is determined whether the name of the information security policy extracted in the step S402 is included in the name group of the information security policies of the conversion rule file 501 shown in FIG. 4B. An example showing the conversion rule file stored in the conversion rule storing module 111 in the table format is shown in FIG. 4B. Although this embodiment describes the conversion rule file in the table format, it is not always expressed in the table format as with the security policy data.

As shown in FIG. 4B, the conversion rule file 501 consists of a rule section 502 and a condition section 503.

The names of the information security policies that can be described in the security policy data are described in the second row of the rule section 502. The names of the user modes corresponding to the names of the information security policies are described in the third row of the rule section 502.

The names of the information security policies that can be described in the security policy data are described in the second row of the condition section 503. The values of the information security policies that can be set in the security policy data are described in the third row of the condition section 503. The conditions for determining whether the settings of the user modes comply with the information security policy are described in the last row of the condition section 503.

In this embodiment, although the conversion rule file 501 is described as what is beforehand stored in the conversion rule storing module 112, it may be configured to receive from the outside (for example, the PC 201) with the network communication unit 102 as with the security policy data. Moreover, the conversion rule file 501 may be distributed to the network communication unit 102 and stored in the conversion rule storing module 112 by an administrator other than the administrator in an information system section who creates the security policy data, such as an apparatus manager.

As shown in FIG. 4B, the "file falsification detection" in the second row of the rule section 502 corresponds to the "PDF with compulsory digital signature" and the "PDF with compulsory hash" among the user modes of the multifunctional peripheral device 101. This is because the multifunctional peripheral device 101 has a function for adding a hash value (a digital signature obtained by enciphering a hash value in the case of the "PDF with compulsory digital signature") of a PDF file compulsorily when generating a PDF file. These values determine whether the information security policy "file falsification detection" is complied or not.

Moreover, the "file transmission method" in the second row of the rule section 502 shows that the "FTP" and the "SFTP" are supported among the user modes of the multifunctional peripheral device 101. This provides a function for selecting propriety of the use of FTP or SFTP as a communication protocol that the multifunctional peripheral device 101 can use, and it is determined based on these values whether the information security policy "file transmission method" is complied. It should be noted that FIG. 18 shows the conversion rule file 501 shown in FIG. 4B in the XML format.

When it is determined that the matched name exists in the step S403 in FIG. 5, the process proceeds to step S406 through step S404. In the step S404, the policy conversion module 111 converts the name of the information security policy stored in the RAM 105 in the step S402 into the name of the user mode described in the rule section 502 of the conversion rule file 501. Then, the policy conversion module 111 stores the converted name in association with the value of the information security policy selected by the administrator into the RAM 105 as intermediate information. For example, the "file falsification detection" in the security policy data 401 in FIG. 4A coincides with the "file falsification detection" of the rule section 502 in the conversion rule file 501 in FIG. 4B.

Accordingly, the policy conversion module 111 converts the name "file falsification detection" of the information security policy into the names of the user modes "PDF with compulsory digital signature" and "PDF with compulsory hash". Then, these names are stored in association with the value "any one is valid" of the information security policy into the RAM 105 as the intermediate information.

On the other hand, when it is determined that the matched name does not exist in the step S403, the policy conversion module 111 stores the name of the information security policy stored in the RAM 105 in the step S402 to the RAM 105 as error information (step S405), and proceeds with the process to the step S406.

In the following case, the determination result in the step S403 becomes NO, for example. It is a case where the name 402 obtained from the security policy data 401 is the "HDD data deletion" and the item "HDD data deletion" is not included in the name group of the information security policies described in the rule section 502 of the conversion rule file.

In the next step S406, the policy conversion module 111 determines whether there is the next line of the information security policy in the security policy data. When it is determined that there is the next line of the information security policy, the process proceeds to step S407, and otherwise the process proceeds to step S408.

In the step S407, the policy conversion module 111 obtains the next line of the security policy data, extracts the name and the value of the information security policy, stores them to the RAM 105, and returns the process to the step S403. The process in the steps S403 through S407 is repeated until reading all the information security policies included in the security policy data. An example of the intermediate information that is expressed in the table format and is stored in the RAM 105 when the whole security policy data shown in FIG. 4A has been read is shown in FIG. 4C.

Figure 4C:
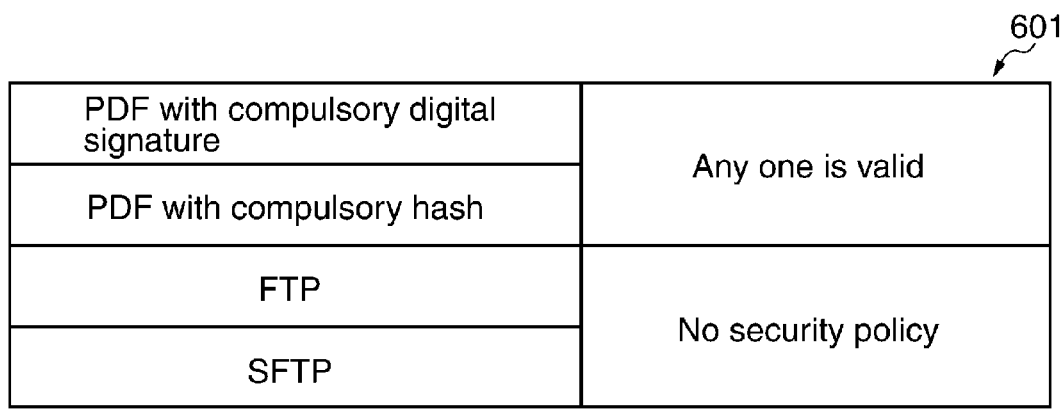
FIG. 4C is a view showing an example of intermediate information stored in the multifunctional peripheral device shown in FIG. 1.

In the intermediate information 601 shown in FIG. 4C, the names "PDF with compulsory digital signature" and "PDF with compulsory hash" of the user modes correspond to the value "any one is valid" of the information security policy. Moreover, the names "FTP" and "SFTP" of the user modes correspond to the value "no information security policy" of the information security policy. Since the "HDD data deletion" in the security policy data 401 does not exist in the conversion rule file 501, it is stored in the RAM 105 (an error information storing unit) as error information in the step S405.

When the whole security policy data has been read, the policy conversion module 111 stores the intermediate information stored in the RAM 105 into the intermediate information storing module 115 in step S408 in FIG. 5, and finishes the process in FIG. 5.

FIG. 6 is a flowchart showing an information security policy application process executed when applying the security policy data to the multifunctional peripheral device 101. It should be noted that this process shall be executed by the CPU 104 according to a program read from the storage unit 106 to the RAM 105 unless otherwise specified.

In step S409, the policy verification module 109 determines whether the whole intermediate information stored in the intermediate information storing module 115 has been read. When it is determined that the whole data has not been read, the policy verification module 109 obtains one value of the information security policy that has not been obtained and a name of the corresponding user mode from the intermediate information, and stores them into the RAM 105 in step S410. In the case of the intermediate information 601 shown in FIG. 4C, the "any one is valid", the "PDF with compulsory digital signature", and the "PDF with compulsory hash" are stored into the RAM 105.

Figure 7A:
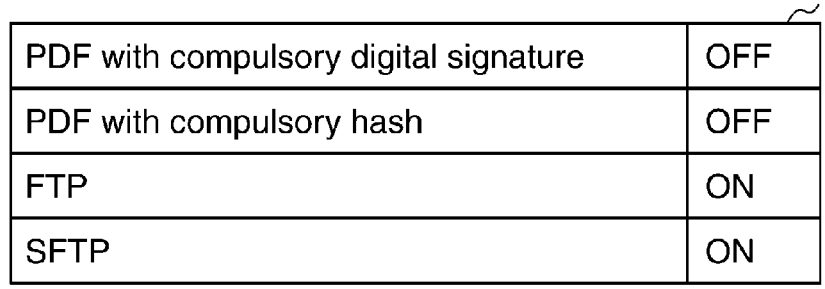
FIG. 7A is a view showing examples of names and values of user modes that are stored in a user mode storing module of the multifunctional peripheral device shown in FIG. 1.

In the next step S411, the policy verification module 109 obtains the value of the current user mode set to the multifunctional peripheral device (MFP) 101 from the user mode storing module 114 using the name of the user mode stored in the RAM 105. FIG. 7A shows the names and the values of the user modes that are stored in the user mode storing module 114 of the multifunctional peripheral device 101 in a table format. It should be noted that "ON" in the table represents that the function indicated by the name of the user mode is valid, and "OFF" represents that the function is invalid. For example, "OFF" is obtained as a value of the "PDF with compulsory digital signature", "OFF" is obtained as a value of the "PDF with compulsory hash", and they are stored in the RAM 105 in the step S411.

In step S412, the policy verification module 109 obtains a condition corresponding to the value of the read information security policy from the condition section 503 of the conversion rule file stored in the conversion rule storing module 112. Then, it is determined whether the current user mode stored in the RAM 105 satisfies the condition.

The "to use method with highest security level" of the condition section 503 shown in FIG. 4B represents that it is determined that the condition is satisfied in the step S412 when the "PDF with compulsory digital signature" of the current user mode is "ON".

The "any one is valid" represents that it is determined that the condition is satisfied in the step S412 when the "PDF with compulsory digital signature" or the "PDF with compulsory hash" of the current user mode is "ON".

The "no information security policy" represents that it is determined that the condition is satisfied in the step S412 regardless of the value of the current user mode. The "OK in encryption communication" represents that it is determined that the condition is satisfied when the "FTP" of the current user mode is "OFF" and the "SFTP" is "ON".

When it is determined that the condition is satisfied in the step S412, the process returns to the step S409. When it is determined that the condition is not satisfied on the other hand, the policy verification module 109 temporarily stores a combination of the information stored in the RAM 105 in the step S410 and the condition obtained from the conversion rule in the step S412 into the RAM 105 as the screen control information (step S413), and returns the process to the step S409.

Furthermore, in this embodiment, the policy verification module 109 does not only check the value of the user mode but also checks whether each application of the multifunctional peripheral device 101 complies with the information security policy in the step S412. Specifically, the policy verification module 109 determines whether each application installed in the multifunctional peripheral device 101 relates to the information security policy. For example, when the information security policy "file falsification detection" is applied, it is determined whether the application installed in the multifunctional peripheral device 101 can comply with the information security policy "file falsification detection". Then, when the application can comply with the information security policy, the file falsification-detection function of the application is compulsorily turned ON, or it is notified to the application concerned that the file falsification detection is made indispensable.

Moreover, when it is determined that the application cannot comply with the information security policy of the file falsification detection in the step S412, the screen control information indicating the application is stored into the RAM 105 in the step S413. Moreover, the starting of the application that does not comply with the information security policy may be restricted.

The process in the steps S409 through S413 is performed until the whole intermediate information has been read. When the whole intermediate information has been read, the process proceeds to step S414.

Figure 7B:
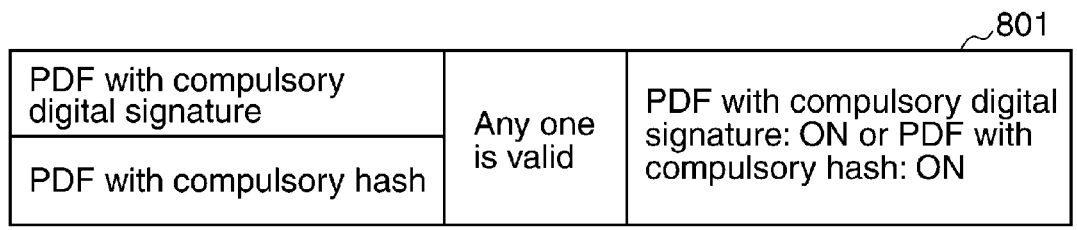
FIG. 7B is a view showing an example of screen control information stored in the multifunctional peripheral device shown in FIG. 1.

In the step S414, the policy verification module 109 stores the screen control information stored in the RAM 105 into the screen control information storing module 116. FIG. 7B shows the screen control information stored in the RAM 105 when executing the step S414 expressed in the table format.

In FIG. 7B, Since the current values of both the "PDF with compulsory digital signature" and "PDF with compulsory hash" of the multifunctional peripheral device 101 are OFF, the condition "any one is valid" is not satisfied, and the screen control information is stored. On the other hand, since the condition of each of "FTP" and "SFTP" is the "no information security policy", the screen control information is not stored.

In step S415 in FIG. 6, the policy verification module 109 determines whether there is a name of an information security policy stored in the RAM 105 as an error in the step S405 in FIG. 5 or screen control information stored in the screen control information storing module 116 in the step S414. When it is determined that there is a name of an information security policy or screen control information, this process is finished after executing step S416. When it is determined that there is not a name of an information security policy or screen control information, this process is finished without executing the step S416. In the step S416, the policy verification module 109 transmits these pieces of information to the PC 201 via the network 126 from the network communication unit 102.

When receiving the name of the information security policy with the network communication unit 202, the PC 201 notifies the administrator that there is an information security policy inapplicable to the multifunctional peripheral device 101. Moreover, when receiving the screen control information from the multifunctional peripheral device 101, the PC 201 displays a display screen as shown in FIG. 8A on the operation-display unit 206 of the PC 201, and notifies the administrator that the multifunctional peripheral device 101 is in the state contrary to the information security policy.

In FIG. 8A, the "HDD data deletion" stored in the RAM 105 as an error in the step S405 is displayed as an item "Error!", and the "PDF with compulsory digital signature" and the "PDF with compulsory hash" that are extracted from the screen control information is displayed as an item "Caution!" It should be noted that a method of sending information with an e-mail or the like may be employed to notify the administrator instead of the method of displaying information on the screen by the PC 201.

According to the above mentioned process, the security policy data generated with the PC 201 can be suitably applied to the multifunctional peripheral device 101. Particularly, the administrator in the information system section can create the information security policy with the PC 201 data without being aware of a function of the multifunctional peripheral device 101, a setting value of a user mode, etc.

Next, an error screen display process in the multifunctional peripheral device 101 to which the security policy data is applied will be described.

Figure 9:
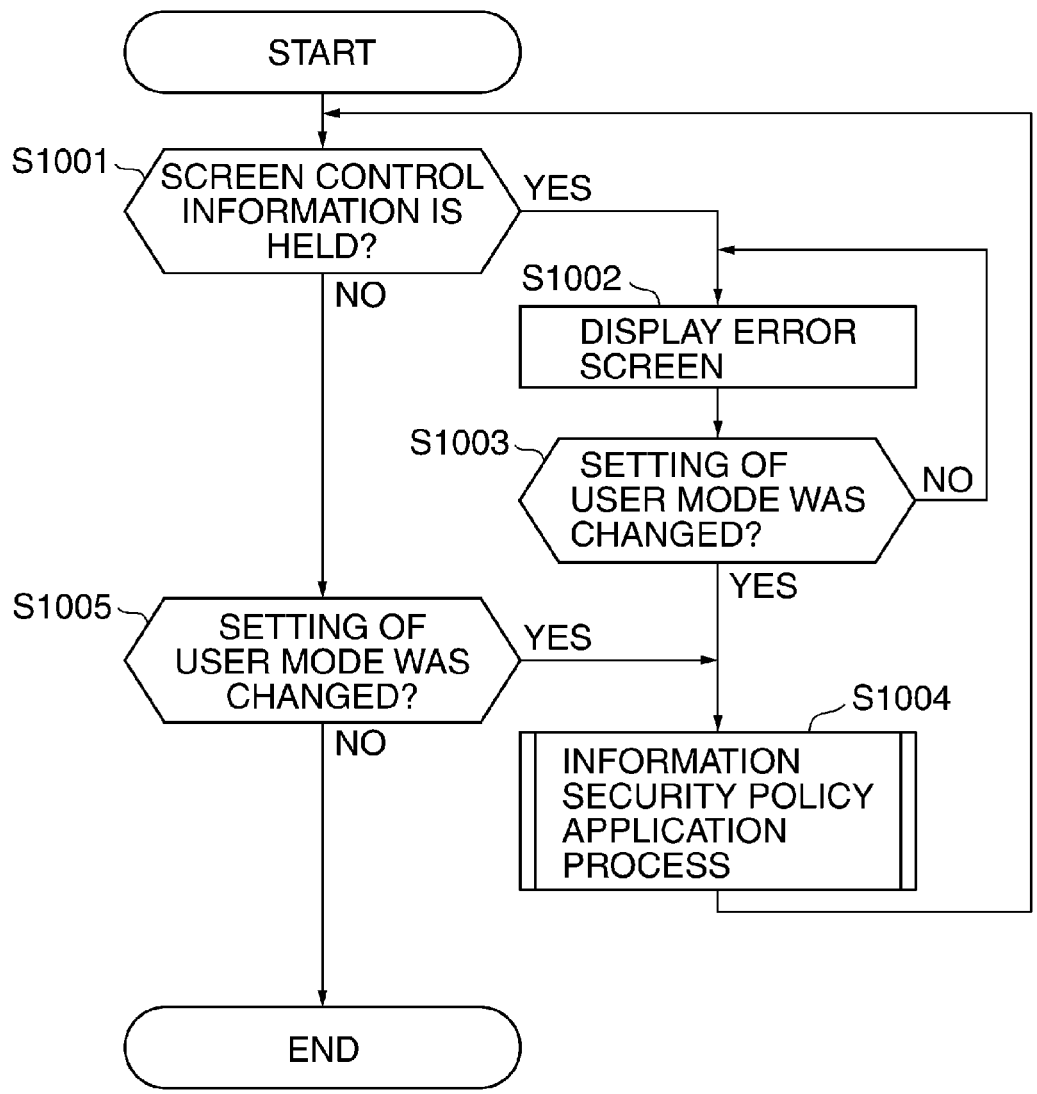
FIG. 9 is a flowchart showing an error screen display process executed by the screen control module in the multifunctional peripheral device shown in FIG. 1.

FIG. 9 is a flowchart showing the error screen display process executed by the screen control module 113 in the multifunctional peripheral device 101. It should be noted that this process shall be executed by the CPU 104 according to a program read from the storage unit 106 to the RAM 105 unless otherwise specified. It should be noted that the process in FIG. 9 is executed after the process in FIG. 6 has been executed.

In step S1001, the screen control module 113 determines whether the screen control information storing module 116 holds screen control information. When it is determined that the screen control information is held, the screen control module 113 displays an error screen in step S1002. An example of the error screen that the screen control module 113 displays is shown in FIG. 8B.

The error screen in FIG. 8B shows that the screen control module 113 extracts the name of the user mode from the screen control information shown in FIG. 7B and that the setting changes of the "PDF with compulsory digital signature" and the "PDF with compulsory hash" are necessary. The error screen in FIG. 8B may show that the information security policy "HDD data deletion" is not applied as the item "<error!>!" as with the error screen shown in FIG. 8A. Then, the error screen in FIG. 8B may show that the function needed to comply with the information security policy "HDD data deletion" will be added to the multifunctional peripheral device 101.

This embodiment will be described on the assumption that the setting of the user mode using the UI operation unit 103 is the only function of the multifunctional peripheral device 101 available to a user in the state where the error screen is displayed. It should be noted that the screen may be controlled so as to allow using functions irrelevant to the user mode that does not comply with the information security policy.

In step S1003 in FIG. 9, the screen control module 113 determines whether the setting of the user mode stored in the user mode storing module 114 was changed by an operation of the user through the UI operation unit 103. When it is determined that the setting was not changed, the process returns to the step S1002 and displays the error screen shown in FIG. 8B. On the other hand, when the setting was changed, the information security policy application process shown in FIG. 6 is performed (step S1004), and the process returns to the step S1001.

When it is determined that the screen control information does not exist in the step S1001, the screen control module 113 determines whether the setting was changed as with the step S1003 (step S1005). When it is determined that the setting of the user mode was changed in the step S1005, the process proceeds to the step S1004. On the other hand, when it is determined that the setting of the user mode was not changed in the step S1005, the process is finished.

This embodiment described the configuration in which the administrator generates the security policy data using the policy generation module 207 of the PC 201. However, when the policy generation module 207 is provided inside the multifunctional peripheral device 101, the system may be configured so that the administrator accesses the multifunctional peripheral device 101 using the UI operation unit 103 or the PC 201 to set the security policy data.

Next, a method of applying an information security policy to an extended application added from the outside will be described.

Figure 10:
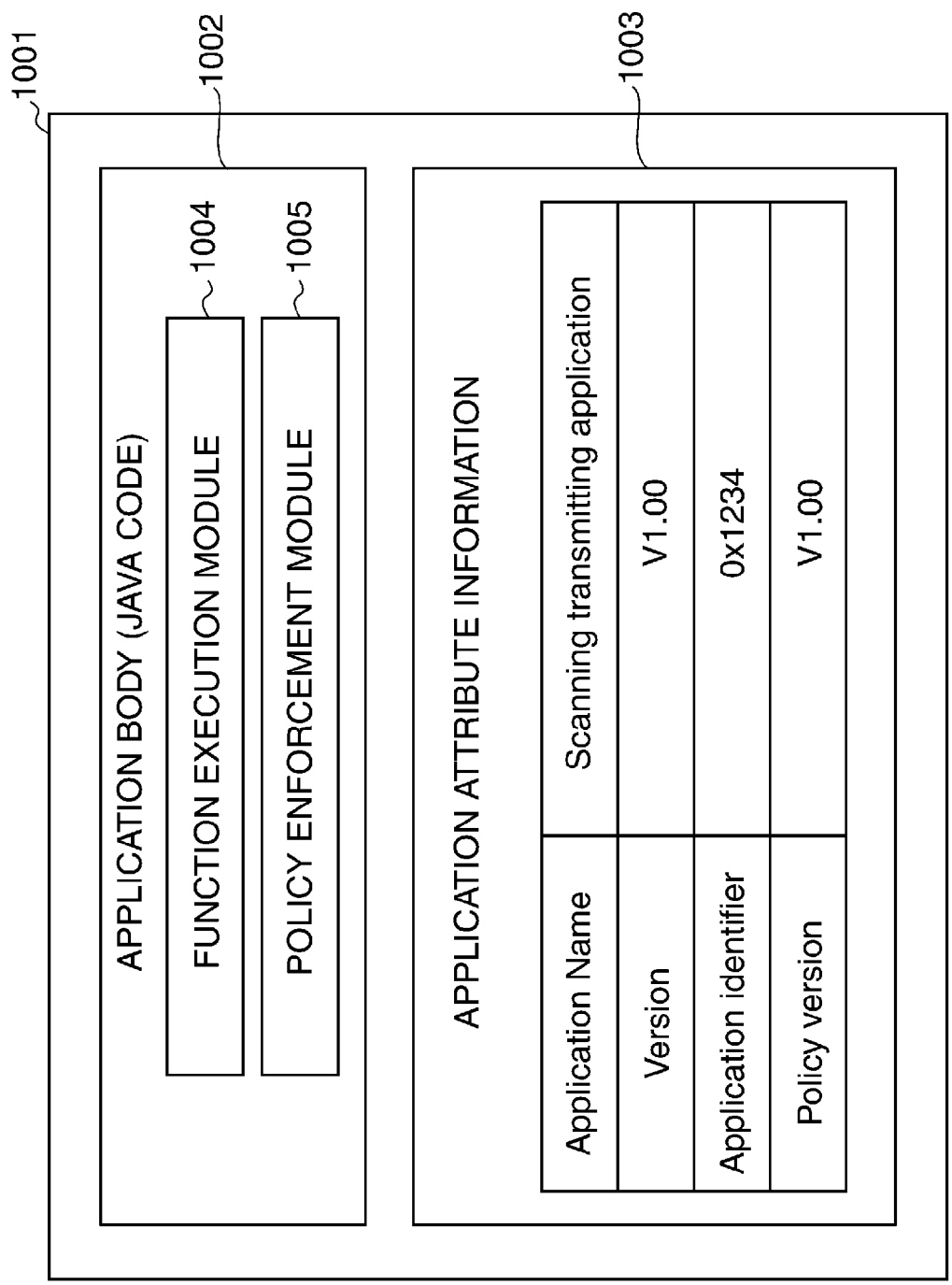
FIG. 10 is a schematic view showing a configuration example of an extended application applied to the multifunctional peripheral device shown in FIG. 1.

FIG. 10 is a schematic view showing a configuration example of an extended application applied to the multifunctional peripheral device 101.

An extended application in a format shown in FIG. 10 is supplied by CD-ROM or network delivery, and its components are decomposed and stored into the multifunctional peripheral device 101 when the application is taken into the multifunctional peripheral device 101.

As shown in FIG. 10, a package 1001 of the entire extended application includes an extended application body 1002 and application attribute information 1003. The extended application body 1002 is configured with a Java (registered trademark) code, for example, and has a function execution module 1004 that actually achieves a function, and a policy enforcement module 1005.

The application attribute information 1003 shows information about the extended application itself, and is also called a manifesto file. The application attribute information 1003 is described in a text format, for example, and describes the information that shows features of the extended application. The illustrated example shows that an application name of the extended application is "scanning transmitting application", a version of the application is V1.00, an application identifier is 0x1234 in hexadecimal, and a policy version is v1.00.

The multifunctional peripheral device 101 is possible to manage and operate a plurality of extended applications using the extended application management module 118. Moreover, an API (Application Program Interface) enables to deliver a scan operation result of the multifunctional peripheral device 101 and to output image data generated by the extended application. Furthermore, the authentication information obtained by user authentication can be delivered, and software that shuts down the apparatus can also be controlled.

Moreover, when an extended application supports the information security policy, a change of the information security policy is notified to the extended application, and related setting values are changed. This can enforce the operation of the extended application concerned within the limits of the information security policy.

Figure 11:
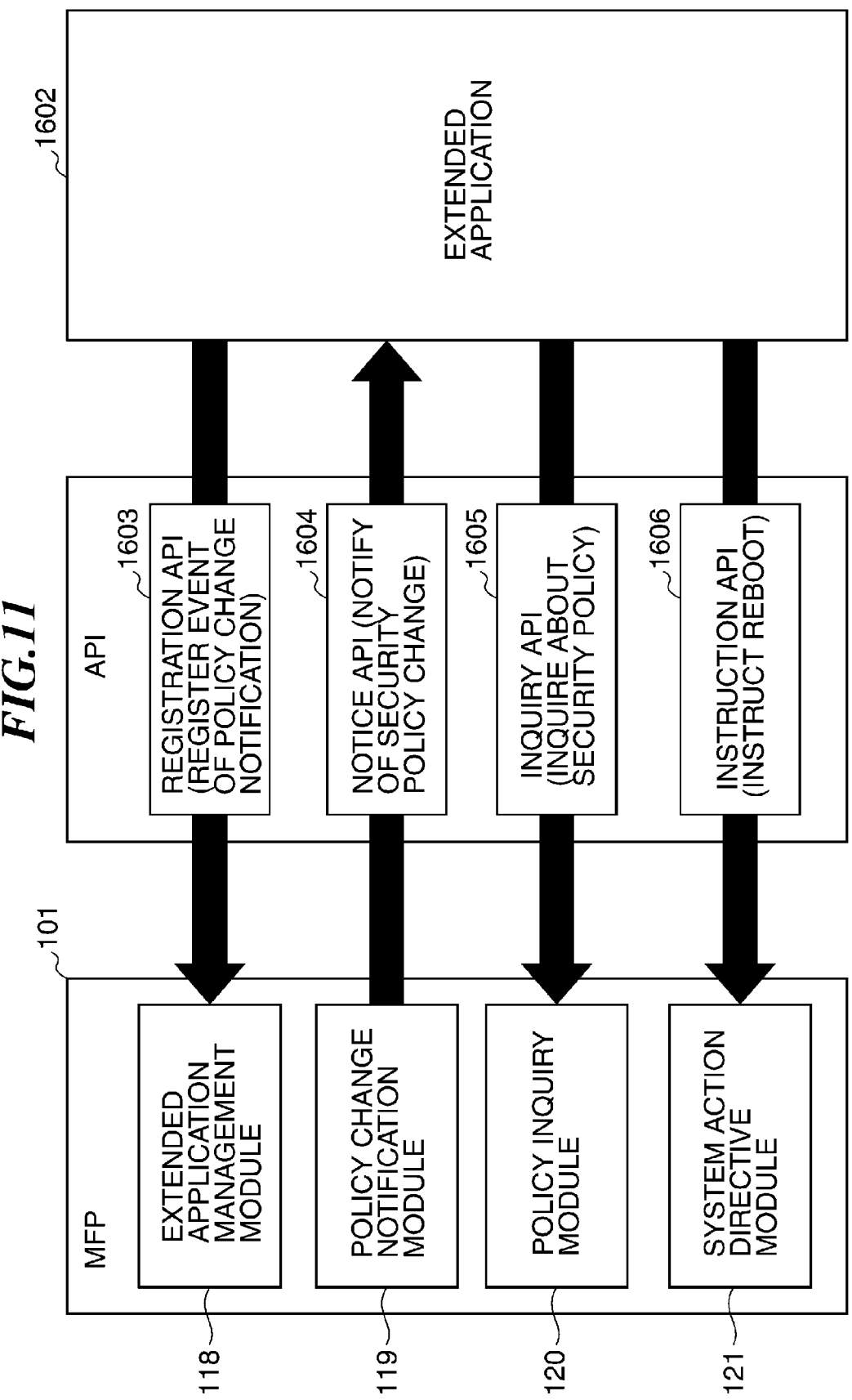
FIG. 11 is a block diagram showing functions of APIs that exchange information and instructions between the multifunctional peripheral device shown in FIG. 1 and the extended application.

FIG. 11 is a view showing functions of APIs that exchange information and instructions between the multifunctional peripheral device 101 and the extended application.

As shown in FIG. 11, the APIs are arranged between the multifunctional peripheral device 101 and the extended application 1602 as interfaces, and exchange information and instructions mutually in response to specified calls.

A registration API 1603 registers an event notification method for notifying of the change when the information security policy is changed during the operation of the extended application 1602. This registration API 1603 notifies the extended application management module 118 in the multifunctional peripheral device 101 of the information from the extended application 1602.

Since the multifunctional peripheral device 101 does not grasp an extended application to be registered beforehand, it registers an event notification method when each extended application starts. Although the message notification that is a general IPC (interprocess communication) is employed as the event notification method, another method may be used as long as it is a correspondence procedure between processes.

A notice API 1604 notifies each extended application of the change information that is issued by the policy change notification module 119, when the information security policy is actually changed. This is achieved by calling the message that was registered by the call of the registration API 1603.

An inquiry API 1605 inquires of the policy inquiry module 120 about the setting value of the information security policy in response to a request from the extended application 1602. The inquiry API 1605 is called when the extended application 1602 starts and when the notice API 1604 notifies of the change of the information security policy. According to this inquiry result, the extended application 1602 compulsorily changes the setting value of itself so as to comply with the information security policy.

An instruction API 1606 instructs reboot of the multifunctional peripheral device 101 to the system action directive module 121 according to a request from the extended application 1602. When the instruction API 1606 instructs the reboot, the multifunctional peripheral device 101 will reboot at the time of completion of all the processes concerning the change of the information security policy.

Figure 12:
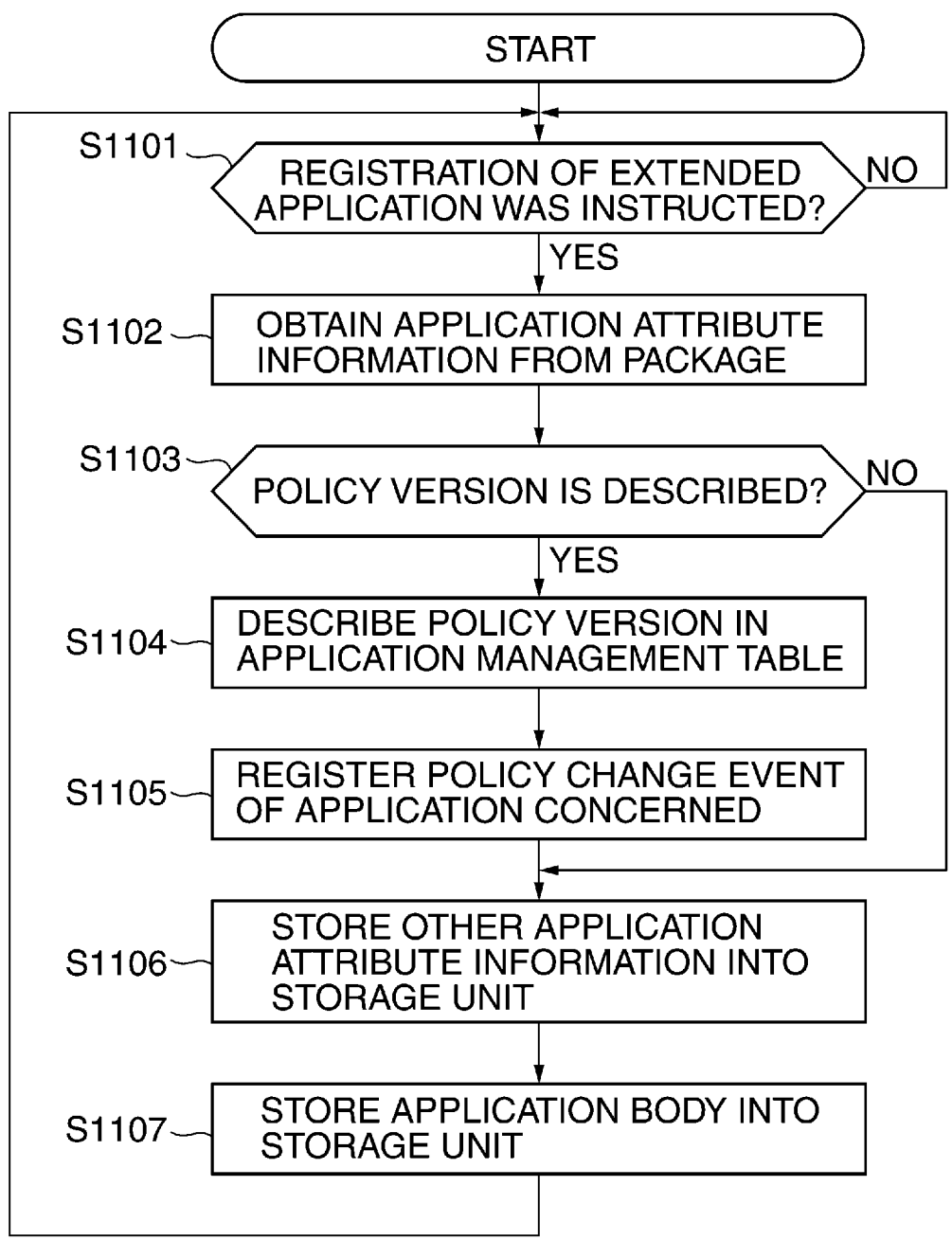
FIG. 12 is a flowchart showing an operation of an extended application management module shown in FIG. 2A.

FIG. 12 is a flowchart showing an operation of the extended application management module 118.

The extended application management module 118 is started when the operation of the multifunctional peripheral device 101 starts, and continues operation henceforth to power supply cutoff.

In step S1101 shown in FIG. 12, the extended application management module 118 determines whether registration of an extended application was instructed. The extended application management module 118 has a Web Service interface (not shown), and transmits the package 1001 of the extended application via the network 126 using web browser software (not shown) of the PC 201.

When it is determined that the registration of the extended application was instructed in the step S1101, the extended application management module 118 extracts and obtains the application attribute information 1003 from the transmitted package 1001 (step S1102), and investigates information written therein.

In step S1103, the extended application management module 118 determines whether the policy version is described. When it is determined that the policy version is not described, the process proceeds to step S1106 by skipping steps S1104 and S1105. When it is determined that the policy version is described, the extended application management module 118 enters the policy version to the extended application management table 1200 (step S1104), and registers the policy change event for notifying the extended application of the policy change with a function of the registration API 1603 (step S1105). Although this is an event that is notified to the above-mentioned policy enforcement module 1005 and the message of the Java (registered trademark) code is assumed, this can be achieved using another interprocess communication.

In the step S1106, the extended application management module 118 stores the application attribute other than the information security policy into the storage unit 106.

In the next step S1107, the extended application management module 118 stores the application body 1002 to the storage unit 106, returns the process to the step S1101, and waits for registration of the following extended application.

FIG. 13 is a view showing an example of the extended application management table 1200. The extended application management table 1200 is managed and held by the extended application management module 118, and an entry is created in the steps S1104 and S1106 in FIG. 12.

As shown in FIG. 13, extended applications 1201 through 1203 are registered. The extended application management table 1200 has entries of the extended applications that are registered into the multifunctional peripheral device 101. Pieces of information 1204 through 1207 inherent to an extended application registered in the extended application management table 1200 are identical to the information described in the application attribute information 1003.

In FIG. 13, the policy version of the "personal secure print" registered as the extended application 1203 is indicated by "- (hyphen)". This shows that the extended application 1203 does not have a policy version, i.e., does not have the function to compulsorily change the setting according to the information security policy. Not having the function to compulsorily change the setting according to the information security policy means that the extended application is an old extended application (a legacy application) that does not support the information security policy, for example. Or it means that there is no setting value restricted by the information security policy in the first place. These cases will be described in a second embodiment.

Figure 14:
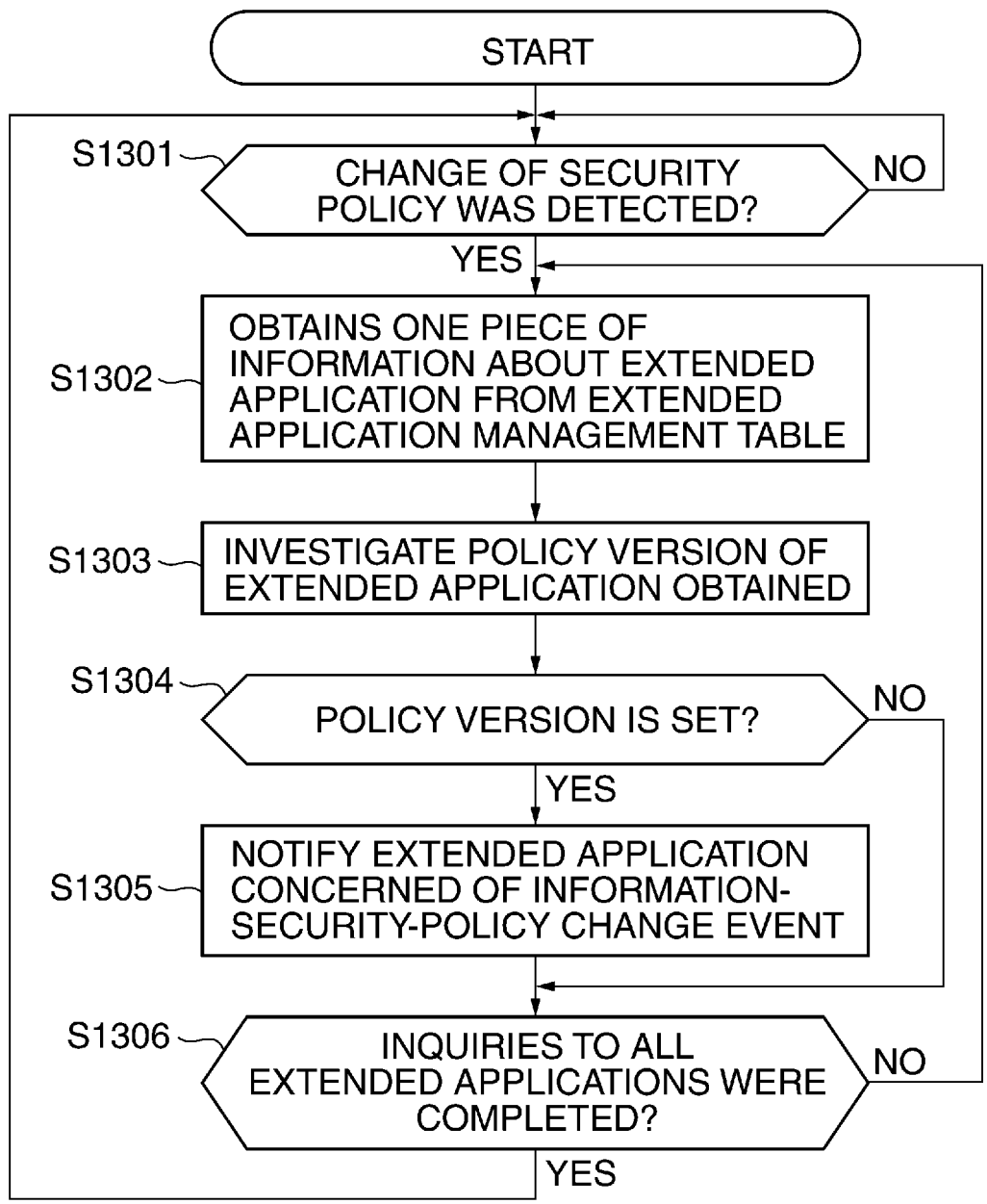
FIG. 14 is a flowchart showing an operation of a policy change notification module shown in FIG. 2A.

Next, an operation of the multifunctional peripheral device 101 when the information security policy is changed will be described. FIG. 14 is a flowchart showing an operation of the policy change notification module 119.

The policy change notification module 119 is started when the operation of the multifunctional peripheral device 101 starts, and continues operation henceforth to power supply cutoff.

In step S1301 in FIG. 14, the policy change notification module 119 determines whether a change of the information security policy was detected. When the change of the information security policy was detected, the policy change notification module 119 obtains one piece of the information about the extended application from the extended application management table 1200 (step S1302). When the step S414 in the security policy application process described in FIG. 6 is executed, it is determined that the change was detected.

Next, the policy change notification module 119 investigates the policy version of the obtained extended application (step S1303), and determines whether the policy version of the extended application concerned is set (step S1304). Since the extended application concerned can support the information security policy when the policy version is set, the policy change notification module 119 notifies the extended application concerned of an information-security-policy change event (step S1305), and proceeds with the process to step S1306. The event is notified using the notice API 1604 of the extended application registered in the step S1105 in FIG. 12, and becomes a trigger for the extended application to detect the change of the information security policy and to inquire the information security policy. On the other hand, when the policy version is not set, the policy change notification module 119 proceeds with the process to step S1306 by skipping step S1305.

In the step S1306, the policy change notification module 119 determines whether the inquiries to all the extended applications in the extended application management table 1200 were completed. When they were not completed, the inquiry to the following extended application is started from the step S1302. On the other hand, when the inquiries to all the extended applications were completed, the policy change notification module 119 returns the process to the step S1301, and waits for the following change of the information security policy.

Next, a method of changing an information security policy in an individual extended application will be described.

FIG. 15A is a view showing an example of the relationship between the information security policy and the setting value in the extended application. Actually, the illustrated relationship may be achieved as a data structure, or may be achieved as a Java (registered trademark) code.

A first line 1401 shows that there is no setting value related to the information security policy "file falsification detection". A second line 1402 shows that it is necessary to turn the FTP communication OFF and to turn the SSL communication ON in the information security policy "file transmission method=OK in encryption communication". Since authentication information flows as plaintext in the FTP communication, the protocol itself cannot be used when only encryption communication is permitted. Moreover, since the SSL communication constitutes the secure socket layer and all the information that flows on this path is enciphered, it can comply with the above-mentioned information security policy.

Figure 16:
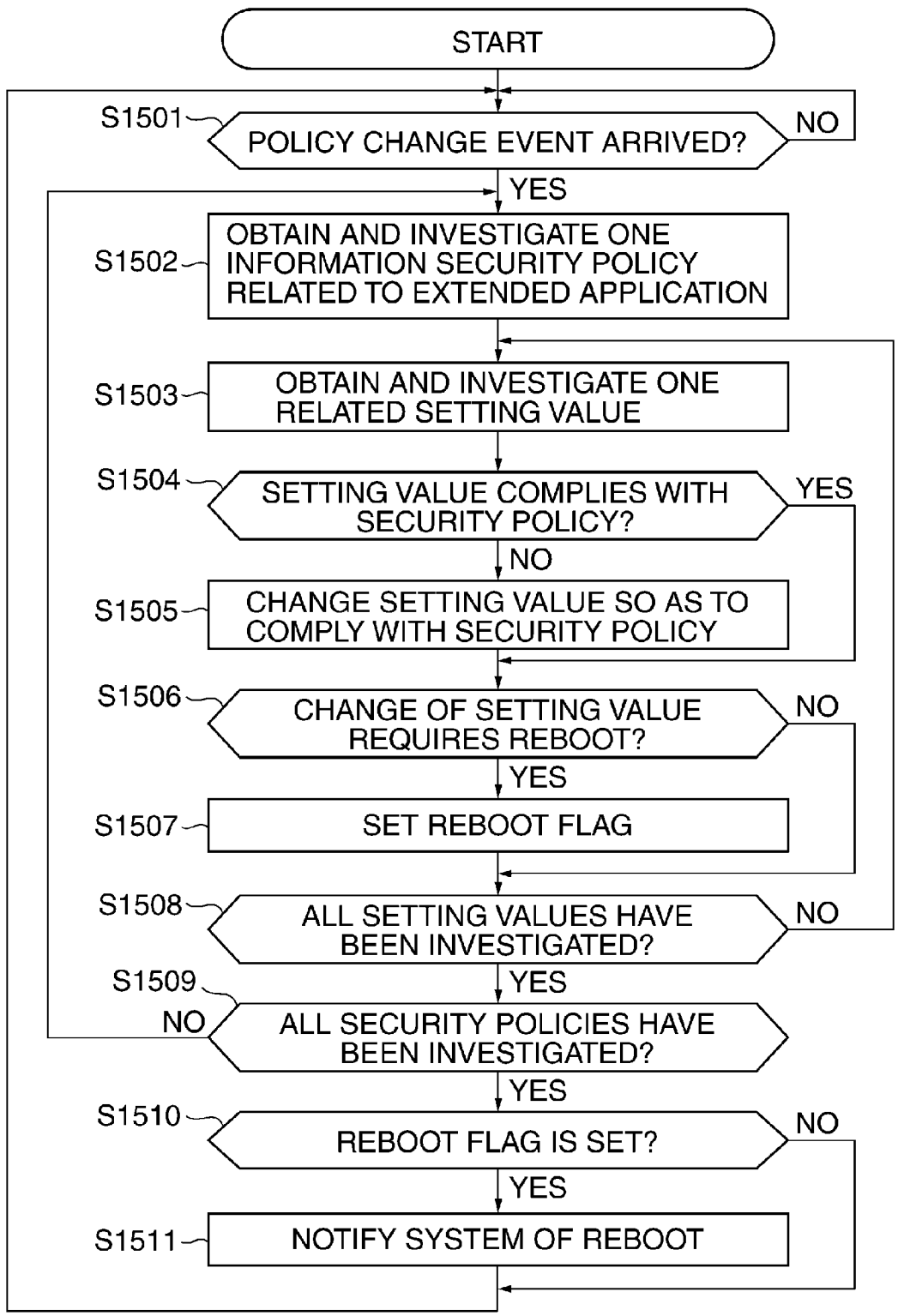
FIG. 16 is a flowchart showing an operation of a policy enforcement module included in the extended application shown in FIG. 10.

FIG. 16 is a flowchart showing an operation of the policy enforcement module 1005 included in the extended application 1002 shown in FIG. 10.

The policy enforcement module 1005 is started when the extended application starts, and changes the setting of the extended application accompanying a policy change.

In step S1501 in FIG. 16, the policy enforcement module 1005 determines whether the policy change event arrived. When it is determined that the event arrived, the policy enforcement module 1005 obtains and investigates one information security policy related to the extended application (step S1502). Since the information security policy of which the setting value is affected in the example shown in FIG. 15A is the "file transmission method=OK in encryption communication" only, this information security policy is paid attention in the step S1502.

In the next step S1503, the policy enforcement module 1005 obtains and investigates one related setting value. The example shown in FIG. 15A has two setting values. First, the setting of the "FTP communication" is paid attention.

In step S1504, the policy enforcement module 1005 determines whether the setting value complies with the information security policy. When the setting value complies with the information security policy, the policy enforcement module 1005 proceeds with the process to step S1506 by skipping step S1505. On the other hand, when the setting value does not comply with the information security policy, the policy enforcement module 1005 changes the setting value so as to comply with the security policy (step S1505), and proceeds with the process to the step S1506. In the example shown in FIG. 15A, the information security policy "file transmission method=OK in encryption communication" requires that the setting value of the "FTP communication" should be "OFF". When the FTP communication is set to ON, the setting value does not comply with the information security policy. In such a case, the policy enforcement module 1005 compulsorily changes the setting value into OFF (step S1505).

In the step S1506, the policy enforcement module 1005 determines whether the reboot is required accompanying the change of the setting value of the information security policy. For example, when a service is being provided via the network, the setting cannot be reflected in real time. In such a case, the reboot of the entire system of the multifunctional peripheral device 101 is needed. Accordingly, the policy enforcement module 1005 determines whether the reboot is required accompanying the change of the setting value of the extended application using the table information shown in FIG. 15B.

In FIG. 15B, a first line 1411 shows that the setting value "FTP communication" is determined to need the reboot. On the other hand, a second line 1412 shows that the setting value "SSL communication" is determined not to need the reboot.

When it is determined to need the reboot in the step S1506, a reboot flag is set in step S1507, and the process proceeds to step S1508. When it is determined not to need the reboot in the step S1506, the process proceeds to step S1508 by skipping the step S1507.

In the step S1508, the policy enforcement module 1005 determines whether all the setting values have been investigated. Here, since the "SSL communication" also needs to be checked, the processing of the steps S1503 through S1508 is performed therefor. When the checks of all the setting values finished, the policy enforcement module 1005 determines whether all the information security policies have been investigated (step S1509).

When not all the information security policies have been investigated, the process proceeds to the step S1502 and the policy enforcement module 1005 investigates similarly the setting value relevant to the following information security policy.

When the investigations about all the information security policies are completed, the policy enforcement module 1005 determines whether the reboot flag is set (step S1510). When the reboot flag is set, the policy enforcement module 1005 notifies the system that the reboot is needed in step S1511 by calling the instruction API 1606, returns to the step S1501, and waits for the following policy change event. When the reboot flag is not set, the process returns to the step S150 by skipping the step S1511.

The above-mentioned first embodiment provides the mechanism that notifies the extended application installed into the multifunctional peripheral device from the outside of the change of the information security policy, and that compulsorily changes the setting value accordingly. This enables to keep the state where the extended application complies with the security policy. Moreover, even when the setting of the extended application is changed compulsorily, the reboot is instructed only when required. This can shorten downtime.

Furthermore, the security policy data is converted into the conditions that should be satisfied by the setting of the multifunctional peripheral device, and it is determined whether the current setting of the multifunctional peripheral device satisfies the converted conditions. Then, when it is determined that the current setting of the multifunctional peripheral device does not satisfy the converted conditions, the use of the multifunctional peripheral device is restricted and review of the setting of the multifunctional peripheral device is informed. This urges to change the user mode so as to comply with the information security policy, and enables to keep the state where the multifunctional peripheral device complies with the information security policy.

Next, a second embodiment of the present invention will be described. The above-mentioned first embodiment described only the case where an extended application can support an information security policy. In this case, when an extended application that does not recognize an information security policy is installed into the multifunctional peripheral device 101, a setting value of the extended application concerned cannot be changed, even if the information security policy is changed.

Moreover, the administrator does not know a need of reviewing the setting value of such an extended application. Accordingly, since the multifunctional peripheral device 101 may be operated in the state that does not comply with the information security policy, there is a risk of being exposed to a security threat.

Accordingly, the second embodiment describes a method of notifying an administrator that a setting value of an extended application needs to be changed to a suitable setting value.

Figure 19:
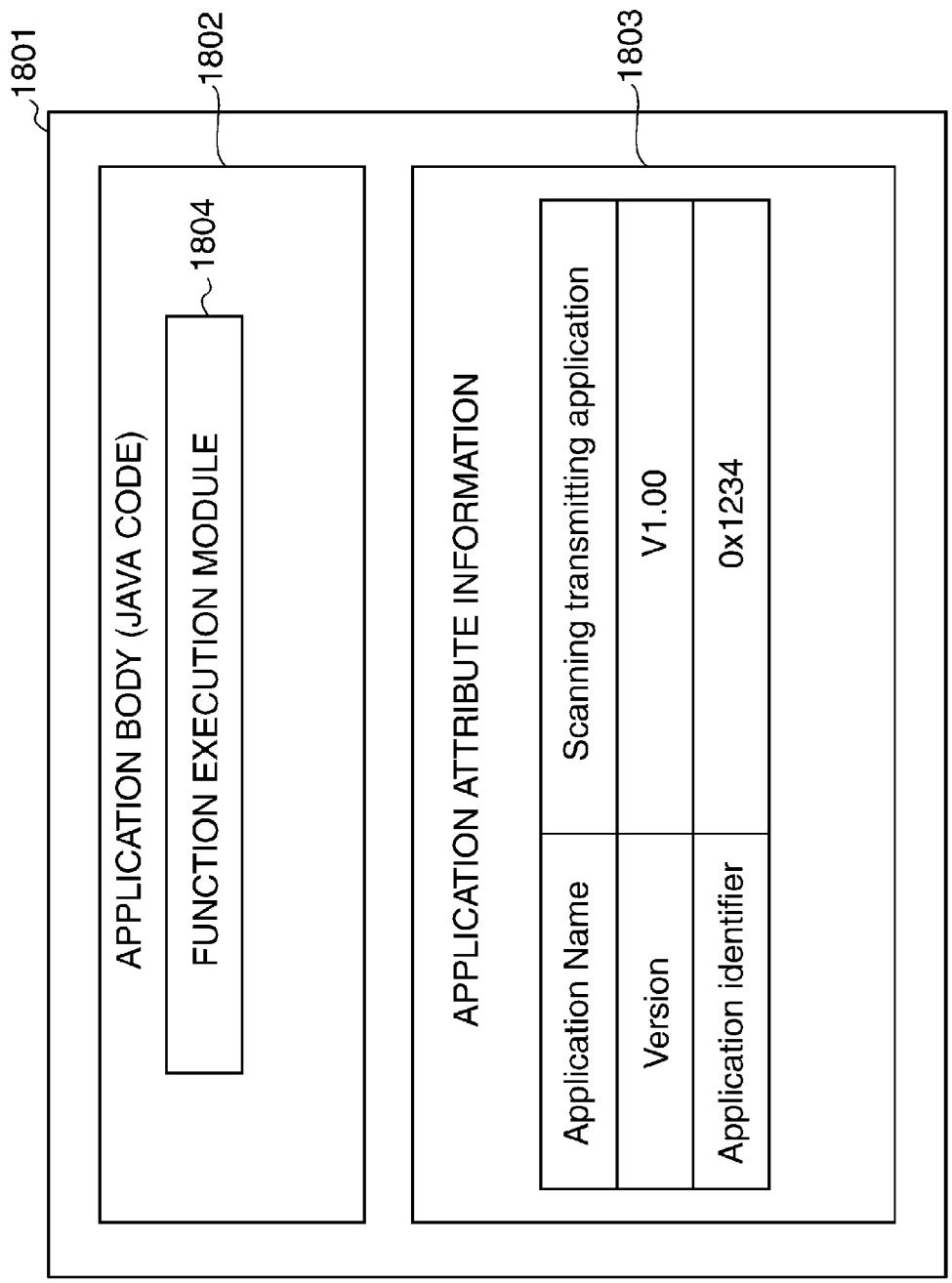
FIG. 19 is a schematic view showing a configuration example of an extended application that does not recognize the information security policy.

FIG. 19 is a schematic view showing a configuration example of an extended application that does not recognize the information security policy. The illustrated extended application package 1801 is configured by removing the policy enforcement module 1005 and the policy version of the application attribute information 1003 from the extended application package 1001 shown in FIG. 10.

Since the illustrated extended application package 1801 does not have the policy enforcement module 1005, the setting of the extended application concerned cannot be changed in compliance with an information security policy even if the information security policy is changed. Since the setting value of such an extended application cannot be automatically enforced according to the change of the information security policy, the administrator of the multifunctional peripheral device 101 is urged so as to change the setting value manually.

Figure 20:
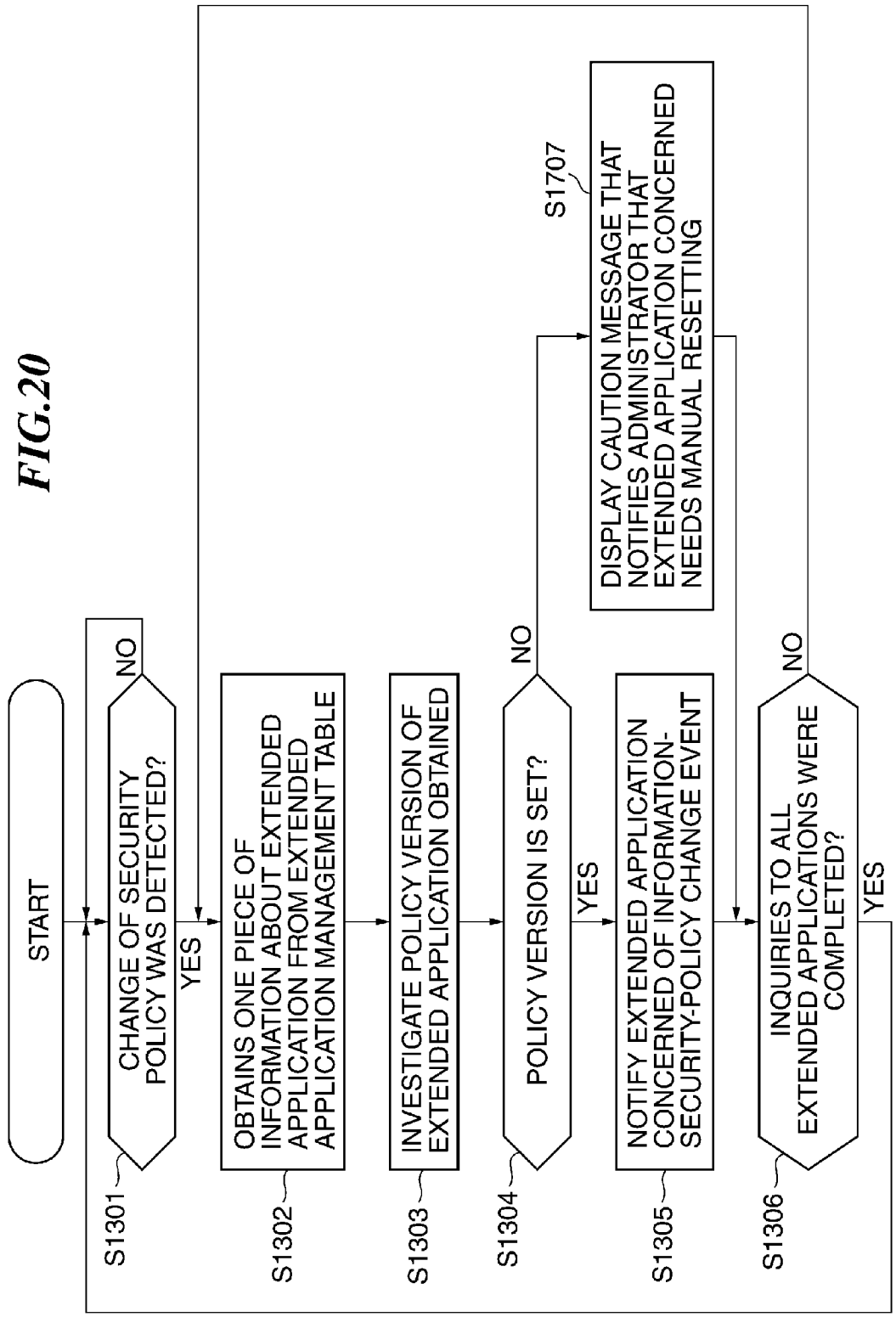
FIG. 20 is a flowchart showing an operation of a policy change notification module according to a second embodiment of the present invention.

FIG. 20 is a flowchart showing an operation of the policy change notification module 119 according to the second embodiment. The flowchart in FIG. 20 differs from the flowchart shown in FIG. 14 in that a step S1707 is added, and only this different point will be described.

In step S1304, the policy change notification module 119 investigates the policy version of the extended application under investigation. When the policy version is not set (the case in FIG. 19 corresponds), a caution message that notifies the administrator that the application concerned needs a manual resetting is displayed on the UI operation unit 103 (step S1707). An example of the caution message displayed on the UI operation unit 103 is shown in FIG. 21. In the second embodiment, an application name and a version name are extracted from the application attribute information 1803 and are displayed in order to identify an extended application.

Thus, a setting value is automatically changed so as to comply with an information security policy as with the first embodiment, when an extended application can support the information security policy. On the other hand, when an extended application cannot support the policy, a caution message is displayed. This enables to show the minimum setting review to an administrator, which minimizes an administrator's setting load.

Next, a third embodiment of the present invention will be described. Items of information security policies are not fixed in general, and a new item may be added according to an addition of a function of a multifunctional peripheral device, a security measure, etc. A policy version of an information security policy identifies items to be supported.

FIG. 22A is a view showing a list of information security policy items under the policy version V1.00, and FIG. 22B is a view showing a list of information security policy items under the policy version V1.01.

In the illustrated examples, when the policy version is upgraded to V1.01 from V1.00, an information security policy item "password needs eight or more characters" is newly added. This information security policy item aims to oppose a threat that a short password easily leaks to others and allows spoofing.

In such a premise, since a specification of an information security policy that may be added is not known beforehand, an extended application is not always able to follow an upgrade of an information security policy. Accordingly, a policy version of an information security policy that the multifunctional peripheral device 101 supports may differ from a policy version of an information security policy that an extended application supports. At this time, an extended application that has been already installed may be unable to enforce a setting value to a newly added information security policy item. An administrator may not know a need of reviewing the setting value of such an extended application, and may operates the multifunctional peripheral device 101 in the state that does not comply with the information security policy. The third embodiment describes a method of notifying an administrator that a setting value needs to be changed to a suitable setting value in such a case.

In the third embodiment, the policy version of the information security policy of the entire multifunctional peripheral device 101 shall be updated to V1.01 when the extended application shown in FIG. 10 is installed into the multifunctional peripheral device 101.

When the policy version is upgraded and the information security policy to the version concerned is set, the policy change notification module 119 is called.

FIG. 23 is a flowchart showing an operation of the policy change notification module 119 according to the third embodiment. The flowchart in FIG. 23 differs from the flowchart shown in FIG. 20 in that steps S2308 and S2309 are added, and only the different points will be described.

When it is determined that the policy version has been set in the step S1304, the policy change notification module 119 compares the policy version of the extended application with the policy version of the multifunctional peripheral device 101 in the step S2308. When both the versions differ, the state of having a difference between the security policies is displayed in the step S2309, and the process proceeds to the step S1305. For example, when the policy version of the extended application is V1.00 and the policy version of the multifunctional peripheral device 101 is V1.01, the process proceeds to the step S2309 and a caution message shown in FIG. 24 is displayed because the version of the multifunctional peripheral device 101 is higher.

As shown in FIG. 24, the caution message displayed includes an extended application name 2401 and an information security policy item 2402 that is the difference.

On the other hand, when the version of the information security policy of the extended application matches with the version of the information security policy of the multifunctional peripheral device 101, the process proceeds to the step S1305 by skipping the step S2309. In such a case, the setting value can be automatically changed so as to comply with the information security policy as with the above-mentioned first embodiment.

According to the third embodiment, when the version of the information security policy of extended application differs from the version of the information security policy of the multifunctional peripheral device, the caution message is displayed. This enables to show the minimum setting review to an administrator, which minimizes an administrator's setting load.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-016864, filed on Jan. 31, 2013, which is hereby incorporated by reference herein in its entirety.

What is claimed is:

1. An image forming apparatus comprising:
a printing unit configured to print image data; and
a memory and a processor configured to:
manage applications which are installable to the image forming apparatus, at least one of the applications being used for executing a job using the printing unit;
receive a security policy data that is transmitted from an external apparatus, the security policy data defining a security policy;
obtain, from the at least one of the managed applications, policy applying environment information indicating an environment for setting a security policy; and
notify, to an administrator, at least one of the managed applications which does not have an environment for setting the security policy defined by the security policy data, based on a result of obtaining the policy environment information from the managed applications.

2. The image forming apparatus according to claim 1, wherein the policy applying environment information includes version information indicating a version of a security policy which is able to be set to an application from which the policy applying environment information is obtained.

3. The image forming apparatus according to claim 2, wherein the memory and processor are further configured to decide the at least one of the managed applications to be notified, based on the version information included in the policy applying environment information.

4. The image forming apparatus according to claim 1, wherein the memory and processor are further configured to notify at least one of the managed applications from which the policy applying environment information cannot be obtained.

5. The image forming apparatus according to claim 1, wherein in a case where the setting environment information obtained from the at least one of the managed applications does not correspond to the environment for setting the security policy defined by the security policy data, the memory and processor are configured to notify the application concerned.

6. The image forming apparatus according to claim 1, wherein the memory and processor are further configured to restrict an activation of the application which does not correspond to the environment for setting the security policy defined by the security policy data.

7. The image forming apparatus according to claim 1, wherein the memory and processor are further configured to perform the notification by displaying information of the application on a display unit.

8. The image forming apparatus according to claim 1, wherein the memory and processor are further configured to notify the administrator a caution message of manually changing a setting value of the application.

9. The image forming apparatus according to claim 1, wherein the managed applications includes at least one of IC card certifying application and personal secure print application.

10. The image forming apparatus according to claim 1, further comprising a scanning unit configured to scan an original and generate image data of the original,
wherein the managed applications includes scanning transmitting application.

11. The image forming apparatus according to claim 1, wherein the security policy includes a security policy for function of at least one of file falsification detection, file transmission method, HDD data deletion, and characters length of passwords.

12. An image forming apparatus comprising:
a printing unit configured to print image data; and
a memory and a processor configured to:
manage applications which are installable to the image forming apparatus, at least one of the managed applications being used for executing a job using the printing unit;
receive a security policy data transmitted from an external apparatus, the security policy data defining a security policy; and
notify, to an administrator, at least one of the managed applications which does not have a function of setting the security policy defined by the received security policy data.

13. The image forming apparatus according to claim 12, wherein the managed applications includes at least one of IC card certifying application and personal secure print application.

14. The image forming apparatus according to claim 12, wherein the at least one of the managed applications has policy applying environment information indicating an environment for setting a security policy.

15. The image forming apparatus according to claim 14, wherein the policy applying environment information includes version information indicating a version of a function for setting a security policy.

16. The image forming apparatus according to claim 15, wherein the memory and processor are further configured to notify at least one of the managed applications from which the policy applying environment information cannot be obtained.

17. The image forming apparatus according to claim 15, wherein the memory and processor are further configured to determine whether or not each of the managed applications has the version information, and then decide the application to be notified, based on the determined result.

18. The image forming apparatus according to claim 12, wherein the memory and processor are further configured to restrict an activation of the application which does not have a function of setting the security policy defined by the received security policy data.

19. The image forming apparatus according to claim 12, wherein the memory and processor are further configured to perform the notification by displaying information of the application on a display unit.

20. The image forming apparatus according to claim 12, wherein the memory and processor are further configured to notify the administrator with a caution message of manually changing a setting value of the application.

21. The image forming apparatus according to claim 12, further comprising a scanning unit configured to scan an original and generate image data of the original,
wherein the managed applications includes scanning transmitting application.

22. The image forming apparatus according to claim 12, wherein the security policy includes a security policy for function of at least one of file falsification detection, file transmission method, HDD data deletion, and characters length of passwords.

23. An image forming apparatus comprising:
a printing unit configured to print image data; and
a memory and a processor configured to:
manage applications which are installable to the image forming apparatus, at least one of the managed applications being used for executing a job using the printing unit;
receive a security policy data that is transmitted from an external apparatus, the security policy data defining a version of a security policy; and
notify, to an administrator, at least one of the managed applications which does not compliant to a version of the security policy defined by the received security policy data.

24. The image forming apparatus according to claim 23, wherein the at least one of the managed applications has version information indicating a version of a security policy to which the at least one of the management applications compliant.

25. The image forming apparatus according to claim 24, wherein the memory and processor are further configured to notify of at least one of the managed applications from which the version information cannot be obtained.

26. The image forming apparatus according to claim 23, wherein the memory and processor are further configured to restrict an activation of the application which does not have a function of setting the security policy of which version is defined by the received security policy data.

27. The image forming apparatus according to claim 23, wherein the memory and processor are further configured to perform the notification by displaying information of the application on a display unit.

28. The image forming apparatus according to claim 23, wherein the memory and processor are further configured to notify the administrator with a caution message of manually changing a setting value of the application.

29. The image forming apparatus according to claim 23, wherein the managed applications includes at least one of IC card certifying application and personal secure print application.

30. The image forming apparatus according to claim 23, further comprising a scanning unit configured to scan an original and generate image data of the original,
wherein the managed applications includes scanning transmitting application.

31. The image forming apparatus according to claim 23, wherein the security policy includes a security policy for function of at least one of file falsification detection, file transmission method, HDD data deletion, and characters length of passwords.

32. A method for controlling an image forming apparatus comprising a printing unit configured to print image data, and a memory and a processor, the method comprising:
managing applications which are installable to the image forming apparatus, at least one of the applications being used for executing a job using the printing unit;
receiving a security policy data that is transmitted from an external apparatus, the security policy data defining a security policy;
obtaining, from the at least one of the managed applications, policy applying environment information indicating an environment for setting a security policy; and
notifying, to an administrator, at least one of the managed applications which does not have an environment for setting the security policy defined by the security policy data, based on a result of obtaining the policy environment information from the managed applications.

33. A method for controlling an image forming apparatus comprising a printing unit configured to print image data, and a memory and a processor, the method comprising:
managing applications which are installable to the image forming apparatus, at least one of the managed applications being used for executing a job using the printing unit;
receiving a security policy data transmitted from an external apparatus, the security policy data defining a security policy; and
notifying, to an administrator, at least one of the managed applications which does not have a function of setting the security policy defined by the received security policy data.

34. A method for controlling an image forming apparatus comprising a printing unit configured to print image data, and a memory and a processor, the method comprising:
managing applications which are installable to the image forming apparatus, at least one of the managed applications being used for executing a job using he printing unit;
receiving a security policy data that is transmitted from an external apparatus, the security policy data defining a version of a security policy; and
notifying, to an administrator, at least one of the managed applications which does not compliant to a version of the security policy defined by the received security policy data.

35. A non-transitory storage medium storing a program for causing an image forming apparatus comprising a printing unit configured to print image data, and a memory and a processor to execute the steps of:
managing applications which is installable to the image forming apparatus, at least one of the applications being used for executing a job using the printing unit;
receiving a security policy data that is transmitted from an external apparatus, the security policy data defining a security policy;
obtaining, from the at least one of the managed applications, policy applying environment information indicating an environment for setting a security policy; and
notifying, to an administrator, at least one of the managed applications which does not have an environment for setting the security policy defined by the security policy data, based on a result of obtaining the policy environment information from the managed applications.

36. A non-transitory storage medium storing a program for causing an image forming apparatus comprising a scanning unit configured to scan an original and generate image data of the original, a printing unit configured to print image data, and a memory and a processor to execute the steps of:
managing applications which are installable to the image forming apparatus, at least one of the managed applications being used for executing a job using the printing unit;
receiving a security policy data transmitted from an external apparatus, the security policy data defining a security policy; and
notifying, to an administrator, at least one of the managed applications which does not have a function of setting the security policy defined by the received security policy data.

37. A non-transitory storage medium storing a program for causing an image forming apparatus comprising a printing unit configured to print image data, and a memory and a processor to execute the steps of:
managing applications which are installable to the image forming apparatus, at least one of the managed applications being used for executing a job using the printing unit;
receiving a security policy data that is transmitted from an external apparatus, the security policy data defining a version of a security policy; and
notifying, to an administrator, at least one of the managed applications which does not compliant to a version of the security policy defined by the received security policy data.

* * * * *